United States Patent
Harris

(10) Patent No.: US 6,222,519 B1
(45) Date of Patent: Apr. 24, 2001

(54) ROLLER OPTICAL GATE DISPLAY DEVICE

(76) Inventor: Ellis D. Harris, 1646 Lynoak Dr., Claremont, CA (US) 91711

( * ) Notice: Subject to any disclaimer, the term of this patent is extended or adjusted under 35 U.S.C. 154(b) by 0 days.

(21) Appl. No.: 09/336,802

(22) Filed: Jun. 21, 1999

(51) Int. Cl.$^7$ .................................................... G09G 3/34
(52) U.S. Cl. ........................................... 345/107; 359/296
(58) Field of Search ............................. 345/84, 85, 107; 359/290, 295, 296, 297

(56) References Cited

U.S. PATENT DOCUMENTS

| | | | |
|---|---|---|---|
| 4,261,653 | * 4/1981 | Goodrich | 345/107 |
| 5,751,268 | * 5/1998 | Sheridon | 345/107 |
| 5,892,497 | * 4/1999 | Robertson | 345/107 |
| 5,900,858 | * 5/1999 | Richley | 345/107 |
| 5,912,652 | * 6/1999 | Seo | 345/107 |
| 5,940,054 | * 8/1999 | Harris | 345/107 |
| 6,055,091 | * 4/2000 | Sheridon et al. | 359/296 |

* cited by examiner

Primary Examiner—Regina Liang

(57) ABSTRACT

In accordance with the present invention an array of strings of hollow beads on a string wherein the beads exhibit both electromagnetic and optical anisotropy are utilized in an array to achieve a display device for the display of electronic image material in ambient illumination. Display beads strung on a string are achieved by means of selective processing glass fiber pulled from a preform that incorporates an outer tube of parallel strands of colored glass, an inner tube of relative soluble glass and a central core of inert glass. Electric anisotropy is achieved by surface treatment of the beads with materials that exhibit a combination of triboelectric and electrophoretic effects whereby the benefits of each supplement the other. Magnetic anisotropy is achieved by the inclusion of magnetic material in the glass fiber from which display beads are formed. The fibers are processed while supported on a precision loom frame that incorporates "V" groves for fiber registration. Electronic drivers are provided as islands of silicon-on-fused-silica-on-tungsten foil on the reverse side of a display substrate with connectivity channels through the substrate to drive electrodes near the display beads.

13 Claims, 23 Drawing Sheets

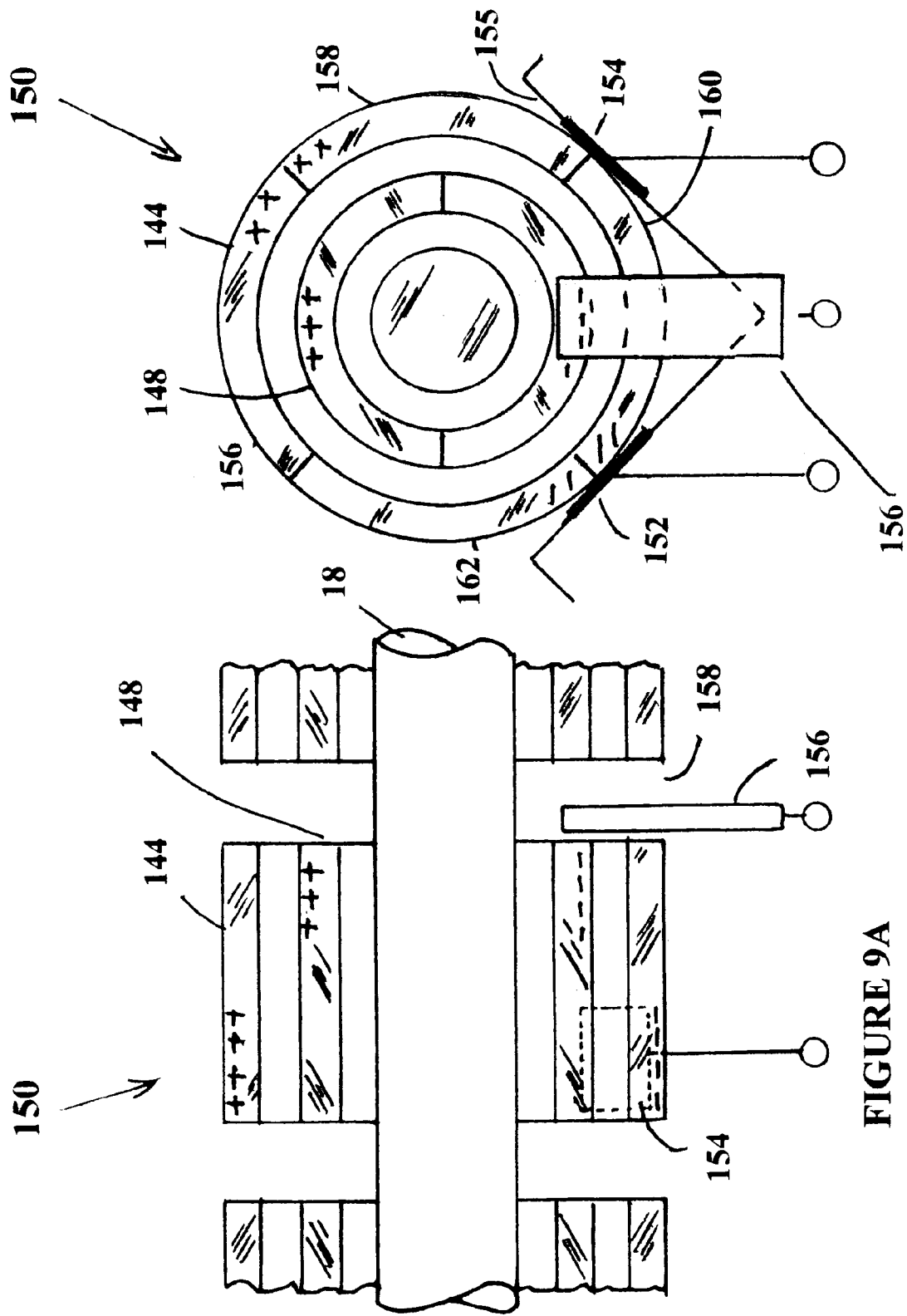

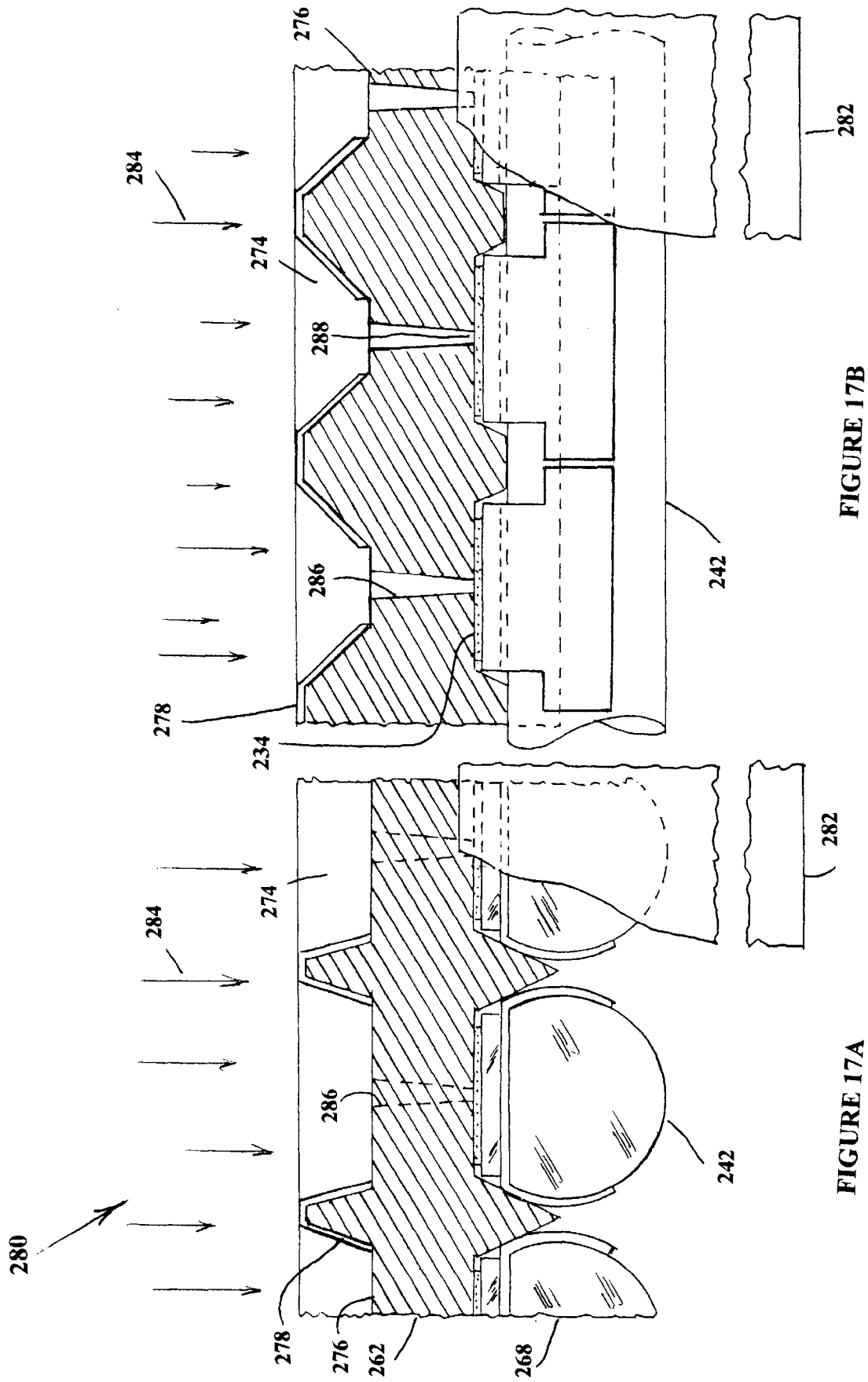

ROLLER OPTICAL GATE DISPLAY DEVICE

BACKGROUND OF THE INVENTION

This invention relates to visual displays comprising rotating hollow beads strung on strings and utilizing optical and electromagnetic anisotropy.

Electrophoresis and triboelectricity are both surface phenomena whereby electric charge is generated on a surface. The combination of electrophoreses and triboelectricity on the same surface enhances the generation and retention of charge over either acting alone. Magnetic anisotropy is established by means of a material that exhibits magnetic activity. For purposes of this invention the term 'electromagnetic activity' will be used to describe activity attributable to either electric activity or magnetic activity acting alone or in combination. Visual anisotropy is achieved by the utilization of colored materials. Display elements are formed as hollow beads on a string or fiber and the beads may be cylindrical, spherical, or of some other shape. The beads are hollow in the sense that they include a central hole through the bead near an axis. The string serves to confine the beads during fabrication and remains an integral part of the resultant display device whereby fabrication is facilitated and mechanical robustness is achieved in the final product.

Triboelectricity is the production of electric charge by friction or contact between dissimilar materials. Friction or relative motion between the materials develops electric charge. Triboelectricity has been and is a key process in the xerographic industry. Toner articles dispersed through an array of capillaries receive electric charge by contact and/or friction as they transit the capillaries. Particles or materials that have acquired surface charge by triboelectricity are capable of being moved, positioned and oriented by an electric field. A novel application of this feature is the utilization of triboelectric materials that develop positive charge along with triboelectric materials that develop negative charge to create bipolar and/or multi-polar particles. The resultant particle is capable of orientation in an electric field. This feature has been described in my U.S. Pat. No. 5,940,054 "TRIBOELECTRIC ELECTRET", which is incorporated herein by reference.

Electrophoreses is an electrochemical process where by an electric charge is developed at a solid-liquid interface as a result of an electrokinetic potential, the zeta-potential. As a result of the induced surface charge a particle will exhibit mobility under the influence of an electrical field. This effect is the basis of liquid xerographic applications. There is experimental evidence that the charge on suspended particles deteriorate with time. In particular, negatively charged particles may lose their charge in a few hours or days.

An inventive application described herein utilizes particles having surface areas that are comprised of materials that exhibit both triboelectric and electrophoretic activity. Electrophoreses generates charge even in the absence of friction or relative motion. Triboelectric effects on the other hand generate charge by friction independent of the electrokinetic potential. In the case of electrophoreses by itself, any ions within the liquid medium will migrate to charged areas on the particles, degrading the charge. These ions can be removed and the charge replenished by triboelectricity. By the combined action of these two effects charge is developed and retained under a wider range of condition than available with either by itself.

Electrophoretic charge anisotropy is the basis for a number of display approaches that utilize bipolar particles. These included, among others, those described in U.S. Pat. No. 4,126,854 (1978), U.S. Pat. No. 4,261,653 (1981), and U.S. Pat. No. 5,751,268 (1998). These prior art systems in general utilize anisotropic microspheres in a fluid filled cavity in an elastomer that is thick relative to the cavities. Electrodes are not integral with the cavity. Drive voltages must be applied external to the elastomer. Because of the elastomer thickness drive voltages are, typically, several tens of volts. With electrophoreses alone a very high resistivity liquid is mandated, and the high resistivity must be maintained over the lifetime of the apparatus. There is no means to replenish charge lost due to ion migration within the liquid.

In the present invention a preferred approach utilizes hollow micro cylindrical elements as beads on a string and in a plurality of cavities wherein drive electrodes are included. These micro cylinders are produced as "beads-on-a-string" by drawing a glass fiber from a preform that is comprised of a number of glass strands and by subsequent processing. A selection of glasses are fused into a preform comprising a plurality of colored glasses fused into a tube around a soluble glass tube which is in turn fused to a relative inert glass core. The preform is heated and pulled into a fiber using well-known techniques. A fiber results which posses essentially the same cross section of glasses as the preform. State of the art methods allow the pulling very long fibers of clad glass having the extreme uniformity and the very small diameters needed to support single mode propagation of laser light.

Colored glass is the preferred material for the outer surface of the fiber. However, optionally, the outer surface of a fiber can be coated with dye dispersed within a suitable polymer to achieve a desired color or plurality of colors.

An optional glass component of the preform, and hence resultant fiber, comprises a glass having magnetic capabilities, for instance iron oxide interspersed in silicon dioxide. Following pulling into a fiber a magnetic polarization is established in the magnetizable glass by an external magnetic field. Exploiting the natural hysteresis of the iron oxide the induced magnetic polarization remains within the glass after the external field is removed.

Subsequent to the pulling the fiber, polymers having a combination of electrophoretic and triboelectric activity are applied to selected regions of the fiber surface. These polymers are selected to exhibit electric activity whereby the triboelectric and electrophoretic activities reinforce each other.

The fiber is next processed to achieve a string of hollow beads-on-a-string wherein each bead comprises a display element bead whereby one picture element is displayed. The multi colored outer region is cut into bead defining segments utilizing state-of-are-art methods. A photo-resist is applied to the fiber, optical exposure of a plurality of rings along the fiber defines the cylindrical elements, and the soluble resist is removed. The resulting rings of unprotected glass are then etched sufficiently deep to cut through the outer multi colored surface glass, but not deep enough to reach entirely through the to the central hard glass core. The uncut portions of the fiber maintain fiber integrity for subsequent processing. When, in a later step the soluble glass is finally dissolved the inert central core remains as string the plurality of multicolor bead segments are cut free to become orientable hollow beads-on-a-string. Each bead is a hollow cylinder comprised of segments of colored glass possessing triboelectric/electrophoretic coatings indexed to the glass colors. Each bead includes both optical and electric isotropy and will become a display element in the inventive display that is the subject of the present invention. The thread upon which the beads are strung is comprised of the uncut fiber core and serves to confine the beads throughout subsequent processing and remain with the beads in the final display device. Manipulation of the very large numbers of elements, which will comprise the display, is greatly facilitated by confining the beads to a string and by further confining the strings of beads to a loom.

Optionally, a smaller bead can be formed coaxially with a larger bead of the same length and occupying the same location on the string. The two coaxial beads at a common display element location allow a more expansive color palette. The two beads of the coaxial pair are oriented independently. Preferably one bead of the pair includes electric anisotropy and the other exhibits magnetic anisotropy. The two beads can, however, exhibit the same type anisotropy and be driven by electrodes or coils spaced sufficiently apart to assure independent action.

A preferred coaxial bead approach comprises a four-color optically transmissive outer bead that exhibits electric anisotropy and is positioned into one of four orientations by a pair of electrodes together with a two color optically reflective inner bead that exhibits magnetic activity and is positioned to one of two positions by a coil. If the four-color segments of the outer bead are composed of: Clear, Blue, Cyan and Magenta and the two color segments of the inner bead are composed of: White and Yellow then a full eight set of primary colors can be obtained. With the inner bead oriented for White the coaxial bead combination can display, White, Blue, Cyan, or Magenta depending upon the outer beads orientation. With the inner bead set for Yellow then the combination can display Yellow, Black, Green, or Red for the same four orientations of the outer bead. The same full eight-color set is available with two other color combinations. Clear must always be included on the outer bead and White always on the inner bead. Red, Yellow and Magenta on the outer bead with Cyan on the inner ad is one combination. Green, Cyan and Yellow on the outer bead with Magenta on the inner bead is the other combination.

In the language of the color industry, color GAMUT is thought of as the three-dimensional space that encompasses all of the colors reproducible by a given process. Color PALETTE are the available specific colors within the gamut.

Subsequent to the pulling of the glass preform into a fiber additional processing generates a plurality of the beads-on-a-string and integrates them into a display device.

A preferred manufacturing approach which facilitates manipulating the many thousands of beads involved is to first mount the fiber as pulled onto a frame or loom much as warp threads are mounted in a weaving process. Many of the process steps to achieve the desired string of-beads-on a-thread are performed while the said fibers are confined to this loom. Positional accuracy of elements of the resultant display device is assured, in part, by the precision to which the loom is machined, including fiber handling "V" grooves within which fibers rest within the loom. State of the art techniques are well known that allow machining over the required extent and to the required precision.

In a subsequent step in the fabrication process a plurality of strings of beads-on-a-thread is transferred from the loom to the display substrate. Cross strand fibers strung upon a separate tooling loom and orthogonal to the strings of beads-on-a-thread are utilized to maintain precision location and spacing of the beads on the strings of beads-on-a-thread during fabrication. Beadwork on looms is an ancient technology, practiced by many cultures. Of passing interest to the present case is the "Sable" beadwork that became famous in France in the 1600's, wherein embroidery was sewn with beads as fine as grains of sand strung on strands of hair.

Electronic drive circuits are also generated as strings of beads-on-a-string with one drive circuit for each display bead location. In a preferred approach a first set of strings comprising driver electronics as beads on a string are affixed to a first face of a thin substrate. A second set of strings, comprising display beads on a string is affixed to the the second face of the substrate. The two sets of strings are preferably mutually orthogonal. With mechanical bonds established between the two sets of strings at their intersections. Electrical connectivity between beads of driver electronics on one substrate face and display beads on the other substrate face is by means of connectivity vias between the two substrate faces by which drive signal is conducted from driver electronic circuits to drive electrodes within cavities containing the display beads. Fabricating the display device wherein the strings of beads on the two faces of the substrate are orthogonal to one other provides a robust assembly. Additionally, providing a mechanical attachment through the substrate between the strings at each intersection adds to the robustness. The resulting assembly then exhibits many of the features of a weaving of warp and weft threads. The two orthogonal sets of threads support each other while providing a measure of mechanical flexibility to the assembly.

The display face of the substrate is comprised of an array of shallow cavities that serve to loosely confine the display beads while allowing freedom to rotate as driven. Closure of the display is by means of a window that comprises an array of shallow cavities that match the cavities on the substrate. To establish a secure mechanical connection from the window to the substrate, cavity defining ridges on both the substrate and the window are bonded to the core fibers upon which the strings of display beads-on-a-string are strung. The window and the substrate are by this means mechanically bonded to each other through a connection to the core fibers upon which display beads are string.

Additional mechanical integrity is achieved by encapsulating the substrate along with driver electronics on the driver face of the substrate in a polymer. As a final fabrication step the internal volume is filled with electrophoretic active liquid and the assembly sealed.

Connectivity traces for signal, synchronization, and power are included on the driver face of the substrate and a signal jack is included in the said encapsulation. These connectivity traces on the driver face of the substrate serve the same purpose as metal traces on a circuit board. Drive signals are connected between the electrodes at each display element bead and its driver circuit by means of the connectivity vias through the substrate. As a result of both repulsive and attractive fields display beads are oriented to present a selected face to a viewer. Once positioned, friction and inertia will serve to maintain bead orientation after removal of the drive signal.

Providing silicon electronics for driving display elements is a major consideration in any flat panel display device, and is of ongoing concern in the industry. Silicon-on-glass is a desirable approach for many reasons. For the highest performance, however, silicon must be processed at temperatures that require most expensive fused silica. Fused silica is highly desirable as a substrate and methods are desirable which minimize the quantity of both silicon and fused silica. This desire is highly compatible with the volume and area requirements of the micro cylinder flat panel display device that is the subject of this present invention. A preferred approach is one similar to that described in my U.S. Pat. No. 6,127,725 "THIN FILM ELECTRONICS ON INSULTOR ON METAL", that issued Oct. 3, 2000. The above referenced patent is hereby incorporated in this present patent application by reference.

In a preferred approach the desired electronic drivers for the display device, particulate fused silica is first deposited in a pattern of thin layers of isolated islands on tungsten foil. The silica is subsequently fused into isolated patches of fused silica glass on the refractory metal foil. Advantage is taken of the fact that the softening temperature of tungsten is significantly above that needed to fuse the silica. Silicon is next deposited on the fused silica islands and processed into high quality silicon at temperatures that are compatible with both tungsten and fused silica. The required electronics are then developed within the silicon by well-known techniques. Advantage is taken of the fact that temperatures needed to process the silicon to achieve its maximum utility are below the operating range of both fused silica and tungsten. A two-dimensional array of isolated islands of silicon electronic circuits on flexible tungsten foil results. Individual circuits are separately testable before utilization in the display array. Circuits that test bad may be tagged and subsequently cut out of the foil. In a subsequent step a good circuit fills the empty spot. Refractory metal foils other than tungsten, such as tantalum are possible.

The tungsten foil containing the two-dimensional array of electronic circuits are integrated with a loom of matching support fibers. Each individual circuit is then cut free by a process that includes folding portions of the adjacent foil loosely around a support fiber. A batch process is utilized whereby an entire row of circuits are processed by a moving tool. As the tool moves over the surface of the loom the entire two-dimensional array of circuits are cut free and loosely attached to the support fibers. The driver electronics thus also become a series of beads-on-a-string on a loom. These circuits remain on the support fibers and with the support fibers become an integral part of the resultant display device. These support fibers are securely attached to the driver face of the substrate by an encapsulation.

The intended display is comprised of a thin molded substrate to which is integrated the anisotropic display elements on a first substrate face and the driver electronics on the second other face. To assure registration integrity the loom of driver elements is integrated with the display substrate while the display substrate is still attached to one half of the substrate wherein it is molded. An encapsulation then seals the drivers to the substrate and provides a robust and permanent subassembly of driver electronics integrated with the display substrate.

With the driver electronics thus assembled to the reverse face of the substrate, the micro-cylinder display elements comprising a loom of strings of display beads-on-a-string are integrated with the upper, or display, face of the substrate after the upper mold half is removed. Metalization for the driver electrodes, together with their interconnectivity vias is added by means of standard processes, utilizing photo resist, optical exposure and development. Mechanical integrity of the assembly during integration of the said strings of display beads is assured by the substrate encapsulation.

The string onto which the display beads are strung is comprised of the uncut central core fiber. During integration of the loom of strings of display beads-on-a-string to the upper substrate face, this central core fiber is made to contact with, and is cemented to, a plurality of ridges of the substrate that lies between rows and columns of display elements. Prior to integration the ridges are contacted with a surface coated with a curable resin which wets the contact surface of the core fiber. Upon curing each core fiber thus become bonded to the substrate along a ridgeline which runs between the rows of display beads. As the substrate has previously been bonded to the driver electronics beads-on-a-string by the encapsulation, the assembly thus becomes mechanically robust.

The inventive display is further comprised of a transparent window through which display beads are viewed. This window includes a plurality of ridges that define a plurality of shallow cavities within which display beads are disposed. Prior to integration of the cavity defining ridges will have been contacted with an adhesive. Upon integration of the window the ridges on both the window and the substrate, wetted with adhesive, contact the core fiber on which the display beads are strung. When the curable adhesive is cured a mechanical bond is established between the window and the substrate through the central support fiber cores upon which the strings of display beads-on-a-string are strung. The substrate has, in a prior step, been securely attached to electronic circuits comprised of electronics driver strings of beads-on-a-string by an encapsulation. By this means a secure mechanical assembly is achieved element by element over the extent of the display.

The loom frames upon which strings of display beads-on-a-string are strung as well as loom frames upon which spacing fibers are strung comprise production tools. They do not become part of the final display. Consequently the said looms can be manufactured with great precision even at great expense. The precision and integrity of these tooling frames become a prime determinant of registration accuracy of elements of the display device.

It is an object of this invention to provide a display device comprising an array of anisotropic display elements as beads-on-a-string. It is another object of this invention to provide a visual display device utilizing display elements that combine visual and electro-magnetic anisotropy. It is a further object of this invention to utilize a combination of electrophoretic and triboelectric effects to produce and maintain electric anisotropy in the elements of the display whereby the beneficial features of each effect supplement those of the other. It is yet another object of this invention to integrate magnetic anisotropy with electric anisotropy for enhanced color presentation. It is an additional object of this invention to provide integral driver electrodes within individual cavities whereby the anisotropic elements are positionable with the low voltages and currents typical of silicon electronic circuits. It is yet another object to provide a visual display capable of displaying electronic image material wherein ambient light provides the illumination and the power requirements of a self-luminous display are obviated. It is a further object of this invention to provide a technology capable of supporting monochrome displays, highlight color displays and full color displays. It is yet another object of this invention to provide manufacturing processes and procedures to enable cost effective production of the intended display device. It is a further object f this invention to provide displays having a range of resolutions and display elements from the lowest instrument need to the highest need for industry and entertainment.

SUMMARY OF THE INVENTION

In accordance with the present invention an array of strings of hollow beads on a string wherein the beads exhibit both electromagnetic and optical anisotropy are utilized in an array to achieve a display device for the display of electronic image material in ambient illumination. Display beads strung on a string are achieved by means of selective processing glass fiber pulled from a preform that incorporates an outer tube of parallel strands of colored glass, an inner tube of relative soluble glass and a central core of inert glass. Electric anisotropy is achieved by surface treatment of the beads with materials that exhibit a combination of triboelectric and electrophoretic effects whereby the benefits of each supplement the other. Magnetic anisotropy is achieved by the inclusion of magnetic material in the glass fiber from which display beads are formed. The fibers are processed while supported on a precision loom frame that incorporates "V" groves for fiber registration. Electronic drivers are provided as islands of silicon-on-fused-silica-on-tungsten foil on the reverse side of a display substrate with connectivity channels through the substrate to drive electrodes near the display beads.

BRIEF DESCRIPTION OF THE DRAWINGS

FIG. 9A presents a longitudinal view of a coaxial pair of beads-on-a-string for an eight-color gamut and illustrating the drive electrodes.

FIG. 9B presents a cross-sectional view of a coaxial pair of beads-on-a-string for an eight-color gamut and illustrating the drive electrodes.

FIG. 17A and 17B present orthogonal views of an assembly step wherein conductive metal is being applied to the display side of the molded substrate.

DESCRIPTION OF THE PREFERRED EMBODIMENT

Figure 1A:
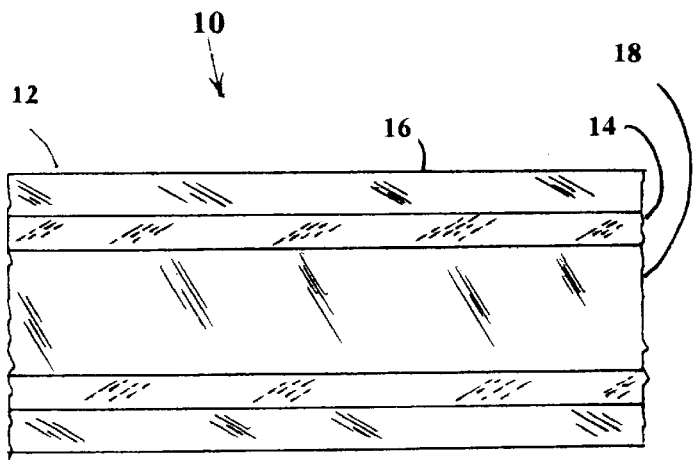
FIG. 1A presents a longitudinal view of a multicolor glass preform as well as the fiber as pulled therefrom.
Figure 1B:
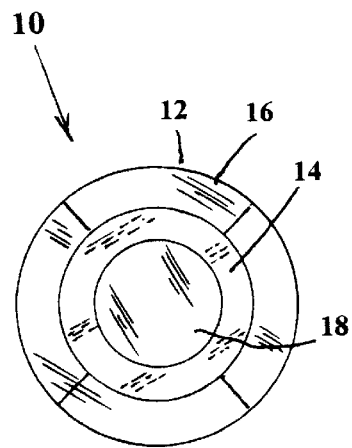
FIG. 1B presents a cross-section view of a multicolor glass preform as well as the fiber as pulled therefrom.

Reference is now made to FIGS. 1A and 1B, wherein is illustrated a glass rod preform 12 and also a glass fiber 10 that is pulled from the preform. FIG. 1A shows a sectional view along the fiber length while FIG. 1B shows a cross-section view. The preform is comprised of a number of different glass materials. At the core of the preform 12 and also the fiber 10 is a glass cylinder 18 of great chemical inertness. Fused silica glass is ideal for this although other glasses are also possible. The outer portion 16 of the preform 12 and fiber 10 is a tube comprised of a plurality of segments of colored glass and is also highly resistant to chemical attack. The plurality of colored segments is disposed in a tube around the perimeter of the fiber 10 in approximately equal segments. In the final display device these glass segments will present the different colors to a viewer and will constitute the color aspect of the display. Between the inert central core glass, 18 and the outer tube 16 of inert colored glass is a glass 14 in the form of a tube that is composed of glass that is highly soluble in a selected chemical.

Upon heating to a particular softening point the glass preform 12 can be drawn into a long thin fiber 10. This is a well-known process in the glass industry. It has been demonstrated that upon drawing a preform, i.e. 12, into a fiber, i.e. 10, the disposition of glasses in the preform will be maintained. A description of the resultant fiber 10 will thus be essentially the same as the preform except for scale. The resultant fiber 10 will thus be comprised of a chemically inert central core 18, along with an outer tube of chemically inert colored glass 16 separated by a tube of highly soluble glass 14.

Figure 2A:
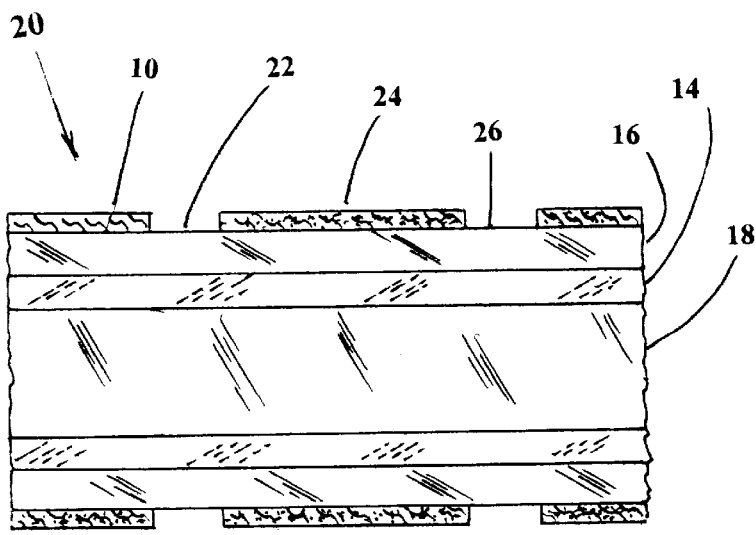
FIG. 2A illustrates the fiber at an early stage of development.

FIG. 2A illustrates the fiber 20 at an early stage of processing the fiber 10 into a string of beads-on-a-string. At the stage of fabrication illustrated in FIG. 2A a photo resist coating 24 has been applied to the fiber, optically exposed and developed to produce a plurality of concentric ring openings 26 in the photo resist 24 around the fiber 10. In an earlier step an electrical anisotropic coating 22 had been applied. The said anisotropic coating is comprised, optionally of the following three: (1) a coating having triboelectric activity, (2) a coating which exhibits electrophoretic activity in the presence of a selected dielectric liquid and (3) a coating which exhibits both triboelectric activity and also electrophoretic activity.

Electrophoretic activity generates electric charge in the presence of a selected dielectric liquid. However, electrophoretic charge is often short lived as a result of, among things, a migration of ions within the liquid. Triboelectric activity generates electric charge as a result mechanical contact or friction between surfaces but is dependent upon a relative motion. The combination of a triboelectric activity and electrophoretic activity in the same coating will exhibit the benefits of both. Charge will be generated by electrophoresis in the absence of relative motion. Additionally, charge will be generated by triboelectricity whenever there is relative motion. Electrophoretic generated charge that might have been degraded, as by ion transport, can then be replenished by triboelectricity. The combined activity of the two effects provides a superior source of electric charge than either acting alone. By the means described above the surface of the fiber is made bipolar by the deposition of selected materials on opposite sides of the fiber. On one side the coating activity will generate positive charge, while on the other side the coating activity will produce negative charge. The electric bipolarity of the fiber will be preserved as the fiber is further processed into a string of beads-on-a-string for application in the inventive roller gate display device, which is the subject of the present invention.

Figure 2C:
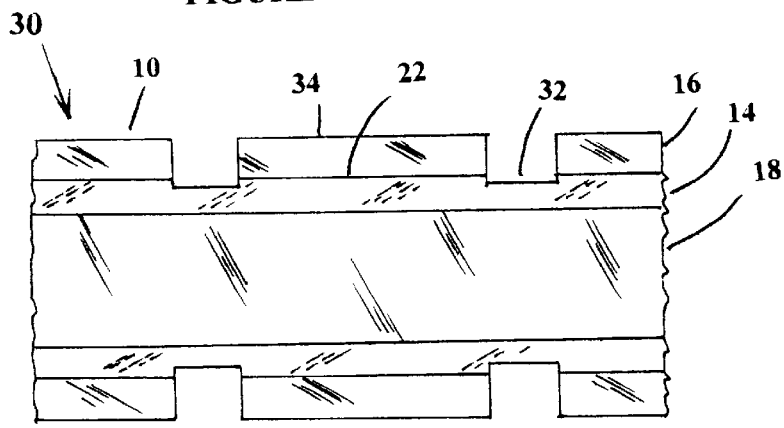
FIG. 2C shows the fiber at a subsequent stage of development.
Figure 2B:
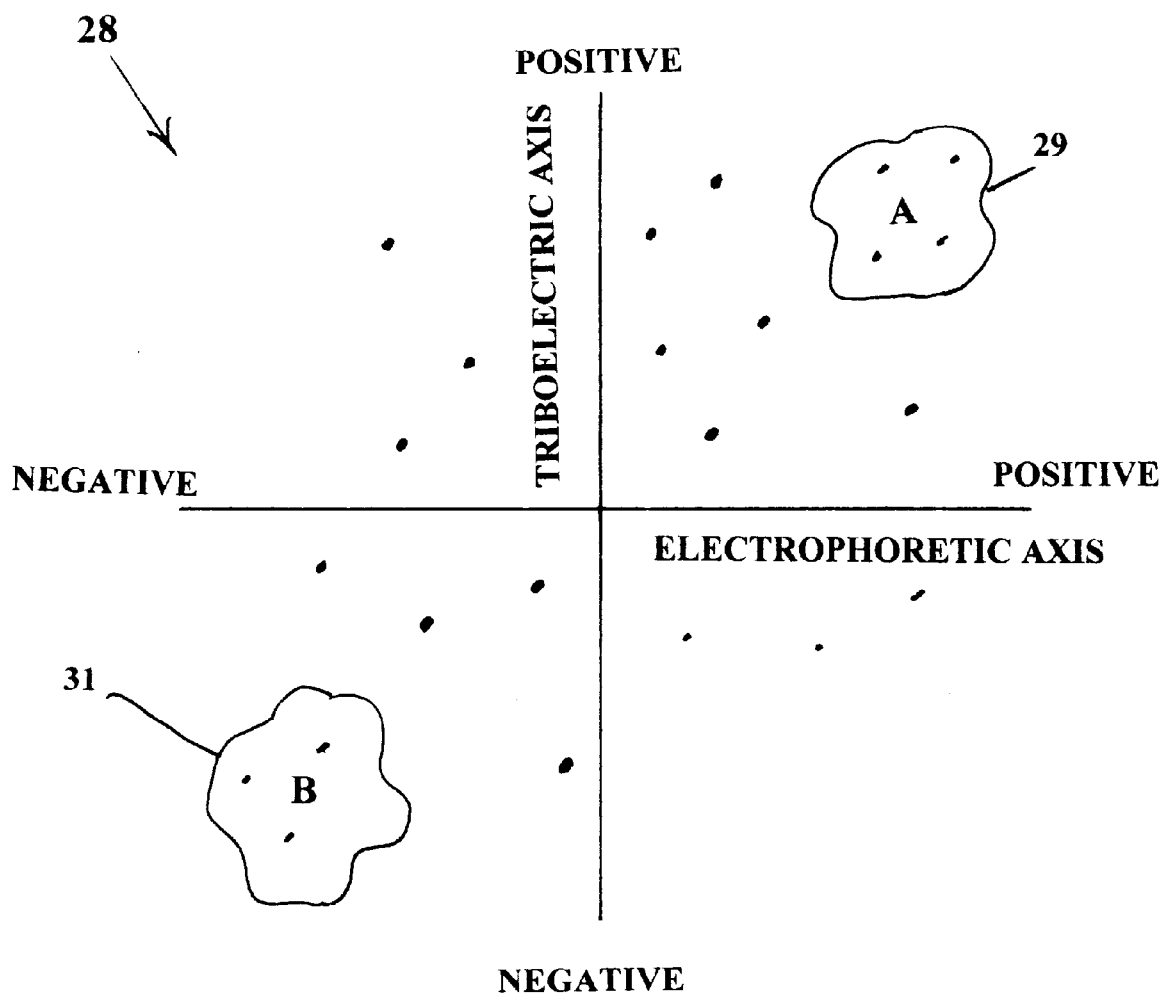
FIG. 2B shows a two-axis plot showing charge developed by triboelectric and electrophoretic effects for hypothetical materials.

FIG. 2B presents a hypothetical plot 28 of electrophoretic activity versus triboelectric activity for a number of materials. In general, a material having positive electrophoretic activity in a given dielectric liquid might have either positive or negative triboelectric activity. Material having correlated electric activity will be identified as those materials near regions "A" 29 and "B" 31.

FIG. 2C illustrates the fiber 30 at a later stage of processing into a string of beads-on-a-string. Utilizing the developed photo resist 24 as an etch mask having openings 26, a plurality of concentric rings 32 has been etched into the surface of the fiber 10. These etch rings define a plurality of proto beads 34 for the eventual beads-on-a-string being developed from the fiber 10. The etch depth is sufficient to cut through the outer tube of colored glass 16, but not sufficiently deep to cut entirely through the soluble glass 14. the outer glass is by this means cut into a plurality of segments each of which define a proto glass bead 34. Here each proto bead 34 remains attached to the fiber 10 by uncut portions of glass 14 and its position on the fiber 10 is maintained. When in a later process step the soluble glass 14 is dissolved the proto beads are cut free and become a plurality of beads-on-a-string, the central inert glass core 18 comprising the string.

Figure 3D:
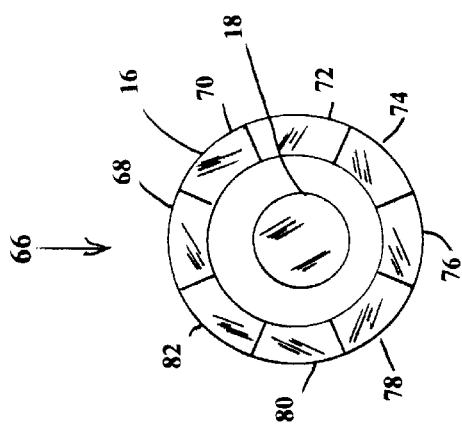
FIG. 3D illustrates a cross-sectional view of a bead-on-a-string for an eight-color display.
Figure 3C:
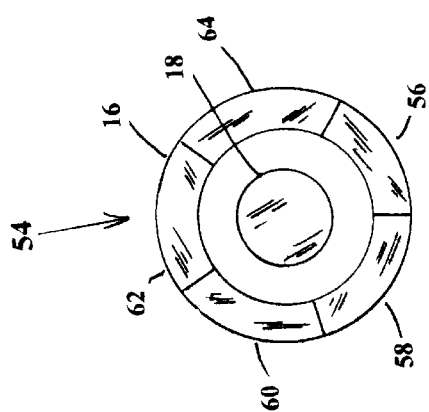
FIG. 3C illustrates a cross-sectional view of a bead-on-a-for a five-color display.
Figure 3B:
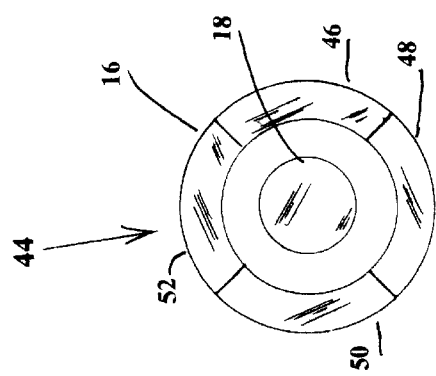
FIG. 3B illustrates a cross-sectional view of a bead-on-a-string for a four-color display.
Figure 3A:
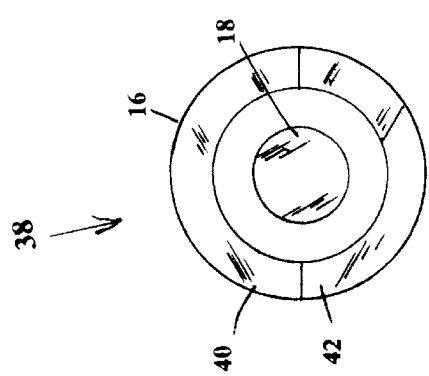
FIG. 3A illustrates a cross-sectional view of bead-on-a-string for a two-color display.

FIG. 3A shows the cross-section 38 of a bead-on-a-string for a two-color display wherein the inert central glass 18 comprises the string. The bead 38 is comprised of two sections 40 and 42 of glass, each of a unique color. A plurality of strings of beads-on-a-string is a major component of an eventual roller optical gate display device. The bead is electrically bipolar as a result of the electrically active coating 22 and is capable of being positioned by an external voltage field. The voltage on an electrode adjacent to the anisotropic bead will tend to position the bead between either of two orientations wherein either of the two colored glasses will become viewable and will thus select between one of two visual appearances of said bead 38. The beads thereby each function as one display element of the inventive Roller Optical Gate Display.

Utilizing various combinations of colored glass in the outer perimeter of the fiber displays that comprise two or more colors are can be produced.

In terms of color literature relative GAMUT is the three-dimensional color space that encompasses all of the colors reproducible by a process. Color PALETTE are the actual colors available within the color gamut.

Beads-on-a-string for several polychromatic displays are illustrated in FIGS. 3B, 3C, and 3D. FIG. 3B shows the multi-colored outer glass 16 as configured for a four-color display bead 44. In a representative case one segment 46 is white, another segment 48 is black, a third segment 50 is green and the fourth segment 52 Is red. When a plurality of beads 44 is utilized in a display device each element of the display will be capable of displaying any one of the four colors: white, black, green or red.

FIG. 3C shows a bead 54 comprised of five colored glasses 56, 58, 60, 62, and 64 in the outer perimeter glass 16.

This bead 54 is capable of displaying any one of five colors when utilized in a roller optical gate display device. By utilizing black and white along with red, green and blue a limited full color gamut is achieved. A different limited full color gamut is achieved with black and white along with cyan, magenta, and yellow.

FIG. 3D illustrates a bead 66 having eight colored glasses 68, 70, 72, 74, 76, 78, 80, and 82 in the outer perimeter glass 16. This bead 66 is capable of displaying any one of eight colors. A full color gamut of black, white, red, green, blue, cyan, magenta and yellow can be achieved with this bead as a display element.

Figure 4:
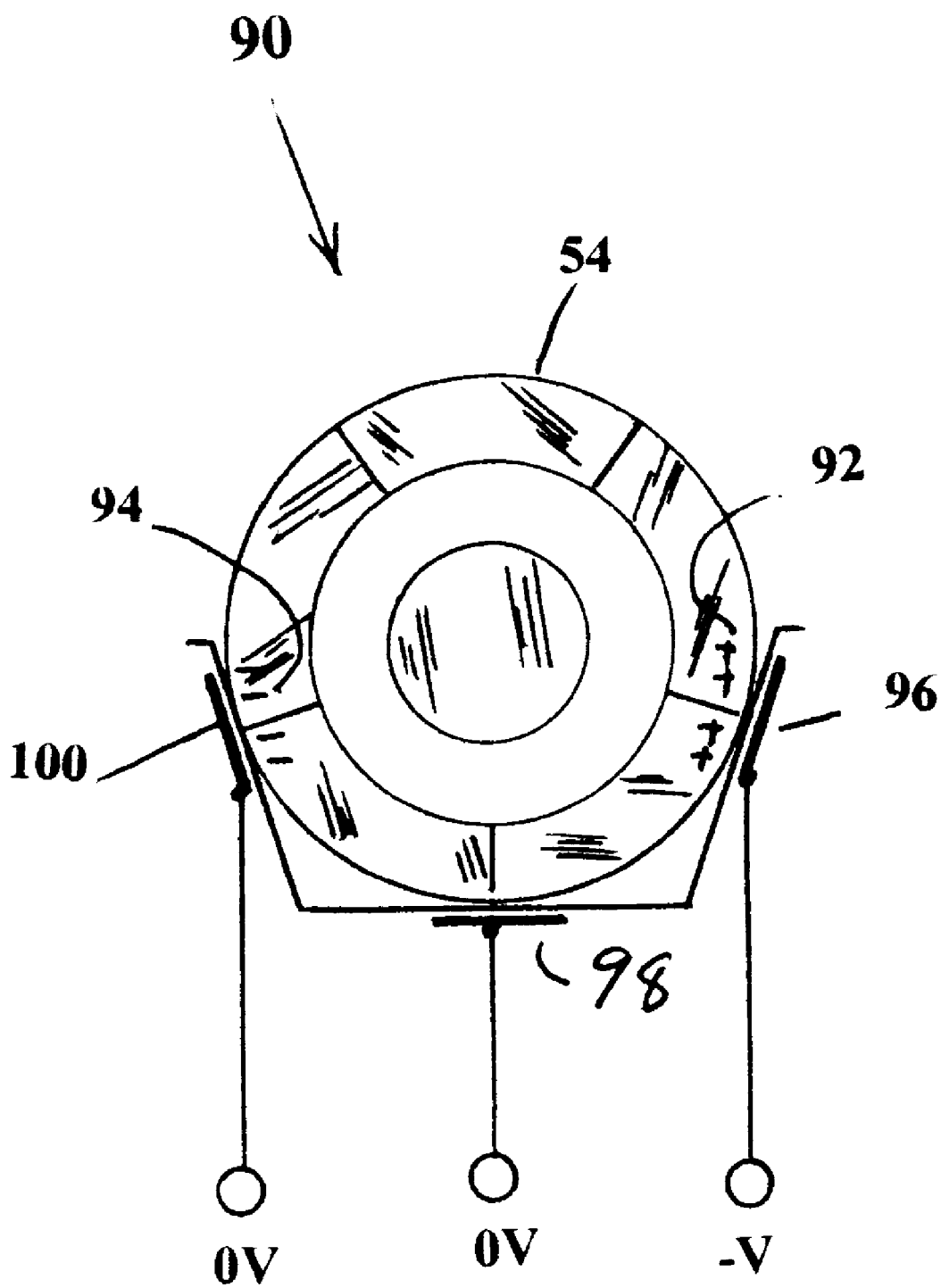
FIG. 4 illustrates a drive electrode configuration for a five-color display.

FIG. 4 illustrates a drive electrode configuration 90 for positioning the five-color bead 54 of FIG. 3C. Here the two opposite electric charge areas 92 and 94 are not symmetrical. Three electrodes 96, 98, and 100 are utilized. By supplying a negative voltage to any one of the three electrodes 96, 98, and 100 the positive pole of the said display bead can be attracted to any one of the three electrodes. By utilizing a positive voltage on an electrode the negative pole of the bead 54 can be attracted to one of the electrodes, completing the five-position/five color capability.

Figure 5A:
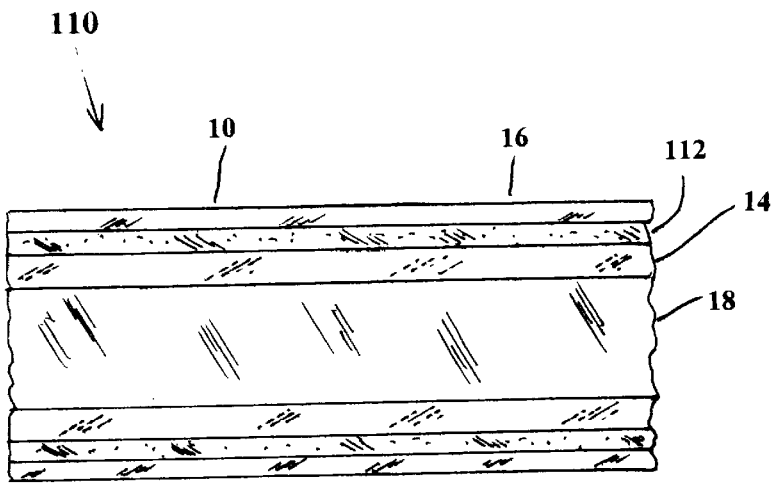
FIG. 5A illustrates a glass preform and the resulting fiber for an element utilizing magnetic glass to achieve magnetic anisotropy.
Figure 5B:
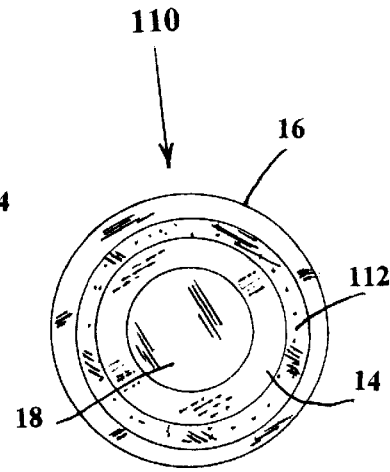
FIG. 5B is a cross-section view of the fiber of FIG. 5A.

FIGS. 5A and 5B illustrate a fiber 110 utilizing a magnetic glass 112 for anisotropy. FIG. 5A shows a section along the fiber while FIG. 5B shows a cross-section. This fiber is pulled from a glass preform wherein the multi-colored perimeter glass 16 includes a magnetizable component 112, for example iron oxide in a silicon-dioxide matrix. Subsequent to the pulling of the fiber a magnetic set is given to the magnetic glass by an external magnetic field. Colored glass 16 is included as an outermost component on the fiber perimeter. As in the case of the electrically anisotropic fiber an inert core 18 and a relative soluble glass 14 is included in the make up of the preform and hence the fiber. Processing of this magnetic fiber 110 follows a near identical approach to that of processing the electrically anisotropic fiber 10.

Figure 6C:
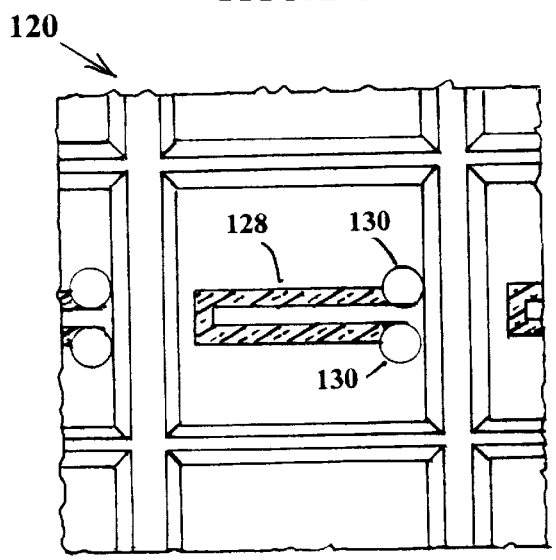
FIG. 6C illustrates a plan view of a cavity for a bead-on-a-string having magnetic anisotropy.
Figure 6A:
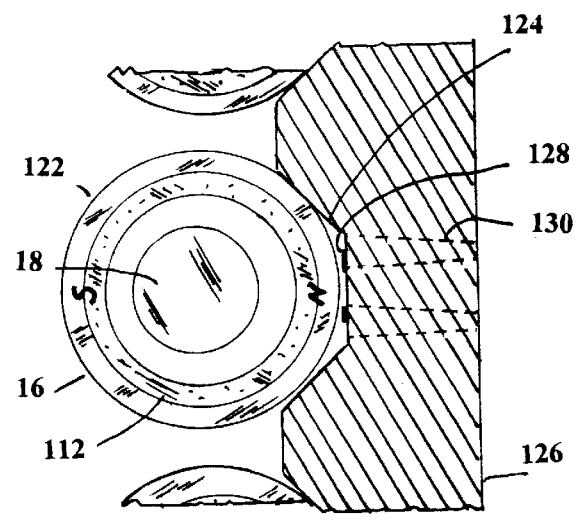
FIG. 6A illustrates a cross-sectional view of a bead-on-a-string having magnetic anisotropy.
Figure 6B:
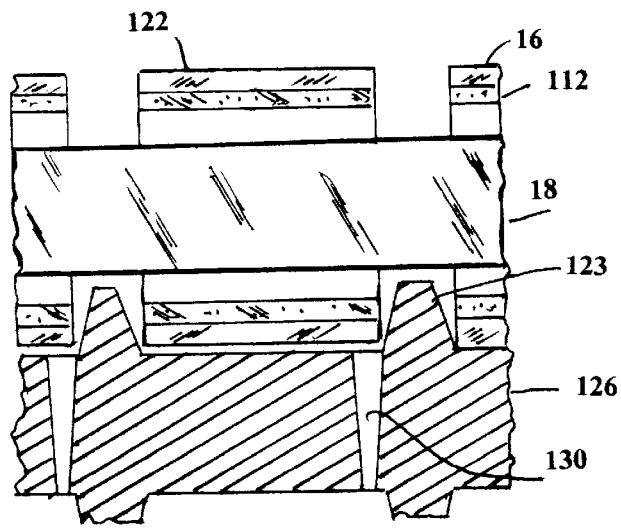
FIG. 6B illustrates a longitudinal view of a bead-on-a-string having magnetic anisotropy.

FIGS. 6A, 6B, and 6C illustrate two cross-section views and a plan view an assembly 120 of a bead 122 possessing magnetic anisotropy into a display device. The assembly comprises a "V" groove 124 in a substrate 126 along with a transparent top closure, not shown. Within the "V" groove is metalization comprising a drive coil 128. Connectivity to electronics on the other side of substrate 126 is achieved by means of through the substrate vias 130. Along the fiber 18 length beads 122 are maintained in position by a plurality of ridges 123.

Figure 7A:
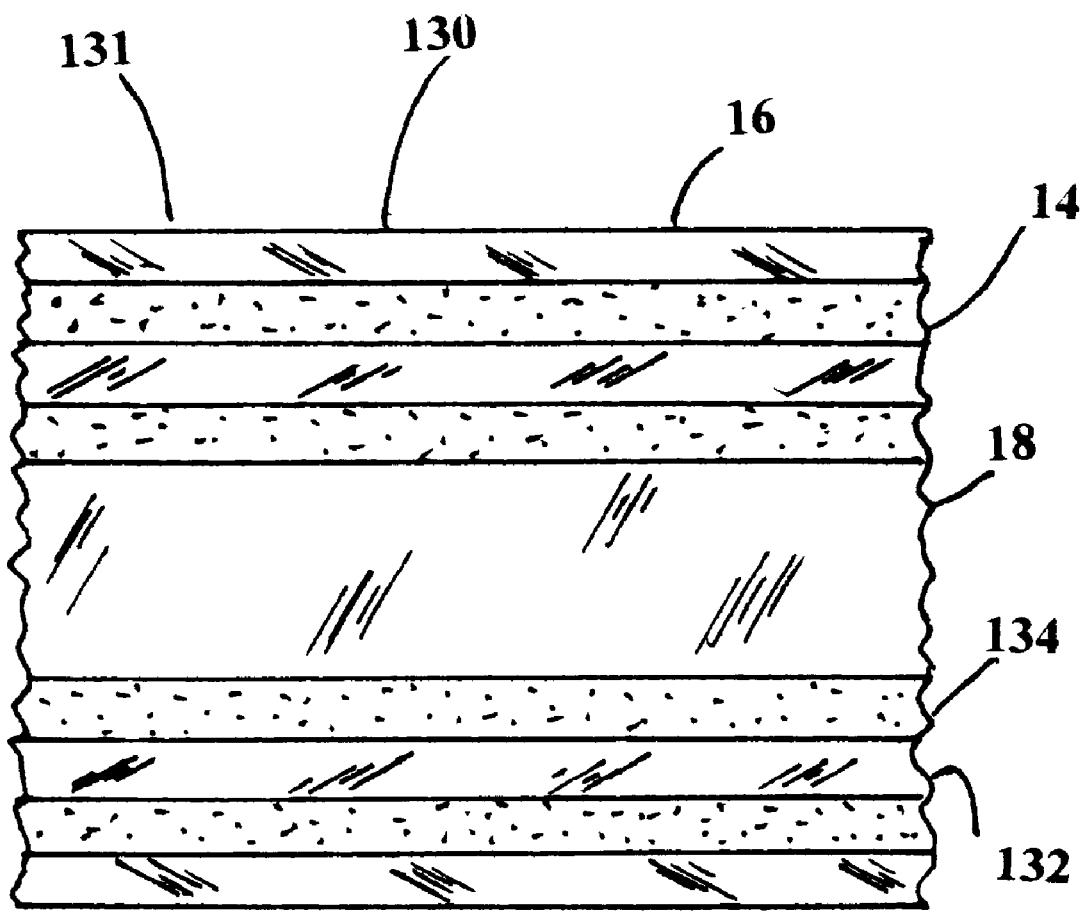
FIG. 7A illustrates a longitudinal view of a glass preform fiber drawn therefrom for a coaxial pair of beads-on-a-string.

FIG. 7A illustrates a glass preform 131 and also the fiber 130 pulled therefrom for a plurality of coaxial beads-on-a-string. In addition to the inert glass center core 18, the outer perimeter of colored glass 16 and the inner tube of soluble glass 14 this preform 131 and fiber 130 is comprised of an additional tube of inert colored glass 132 and an additional tube of soluble glass 134. Processing into a plurality of coaxial beads-on-a-string utilizes similar techniques as used for single bead.

Figures 7B, 7C:
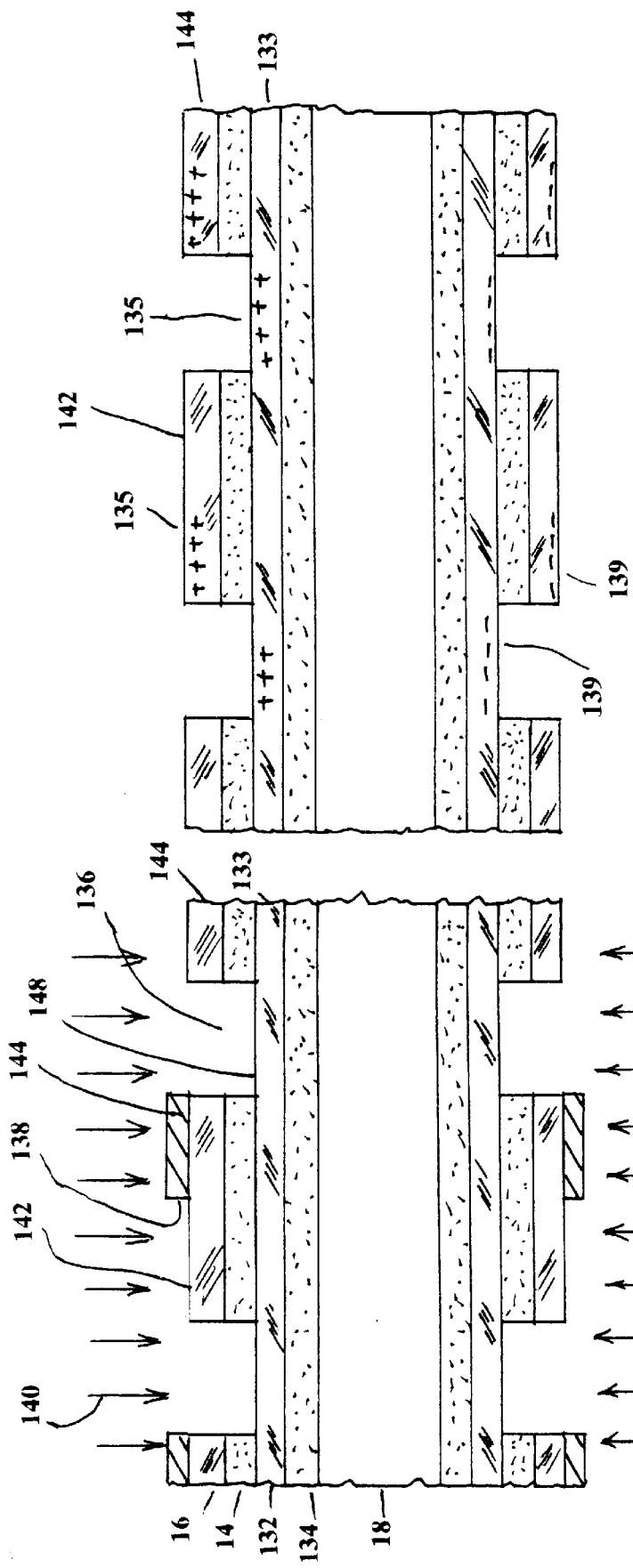
FIG. 7B illustrates a longitudinal view of a glass fiber for a coaxial pair of beads-on-a-string at an early stage of fabrication.
FIG. 7C illustrates a longitudinal view of a glass fiber for a coaxial pair of beads-on-a-string at a later stage of fabrication.

FIG. 7B illustrates the coaxial fiber in a step of the process. Here the outer glass perimeter of colored glass 16 and the outer most soluble glass tube 14 have been etched to produce a plurality of concentric rings 136 on the perimeter of the fiber wherein the concentric rings define a plurality of proto beads 142. One half of the length of each of the plurality of proto beads 142 is protected by a developed resist 138. The etched rings 136 are of a length approximately equal to half of the length of the proto beads 142. Application of an electro active coating 140 will then coat a half bead length of each outer bead element 144 and a half bead length of the inner colored glass 132 that will become the inner beads 148.

FIG. 7C illustrates regions 135 and 139 where electric charge can develop on the coaxial proto bead pair 138 as a result of the said application of the electro active coating 140.

Figure 8B:
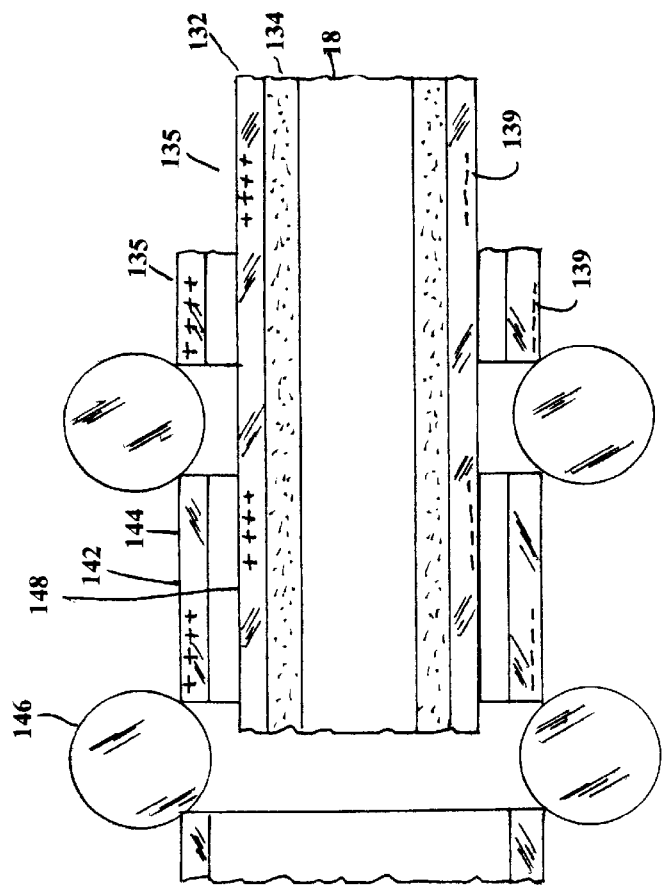
FIG. 8B illustrates a longitudinal view of a glass fiber for a coaxial pair of beads-on-a-string at a yet later stage of fabrication.
Figure 8A:
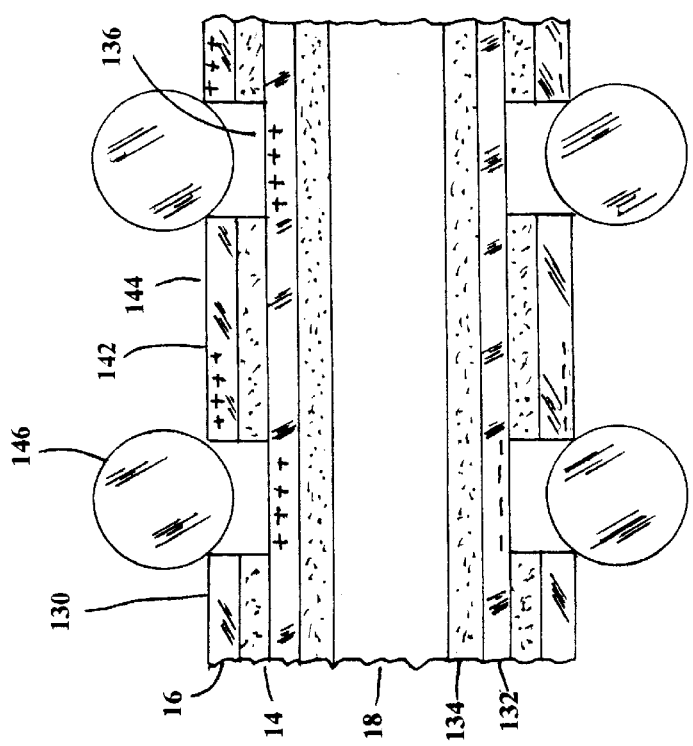
FIG. 8A illustrates a longitudinal view of a glass fiber for a coaxial pair of beads-on-a-string at a still later stage of fabrication.
Figures 8C, 8D:
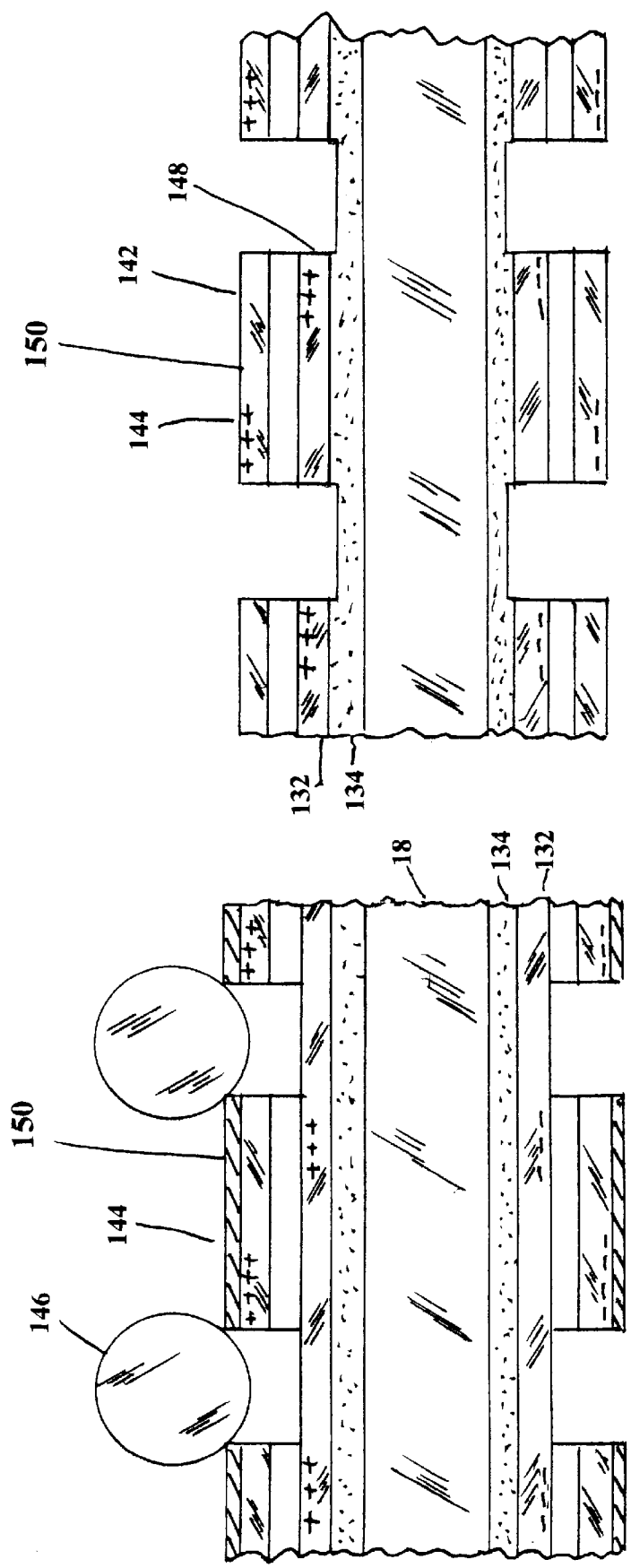
FIG. 8C illustrates a longitudinal view of a glass fiber for a coaxial pair of beads-on-a-string at a yet later stage of fabrication.
FIG. 8D illustrates a longitudinal view of a glass fiber for a coaxial pair of beads-on-a-string at a yet later stage of fabrication.

FIG. 8A illustrates the plurality of coaxial proto beads being held in position for additional processing by a loom of helper fibers 146. With the helper fibers 146 in place between segments of outer bead elements 144, the soluble outer tube of soluble glass 14 can be dissolved while position of the outer proto bead is maintained on the string 18. Upon dissolving the soluble glass 14 the outer segments 144 of the eventual plurality of coaxial beads-on-a-string will become free as indicated in FIG. 8B. However, the three inner fiber components 134 and 132 will remain attached to each other and to the center core fiber 18. These three central components 18, 34, and 132 can now moved relative to the outer elements 144 by an amount whereby the electro-active regions of outer bead elements 144 and the electro-active region of the glass that will become inner bead elements 148 will be placed at opposite ends of the eventual coaxial bead 150 as illustrated in FIG. 8B. FIG. 8C illustrates a further process step wherein photo-resist has been applied as a mask to accommodate an etch step wherein glass 132 is etched.

FIG. 8D illustrates and illustrates additional etching whereby the proto beads 142 have been delineated. The etching has cut through the inner most tube of colored glass 132 but not entirely through the soluble glass 134. Both inner bead element 148 and outer bead element 144 of the coaxial bead 15 can be maintained in position by a loom, not shown, of fibers 146. When the innermost soluble glass 134 is finally dissolved the inner bead element 148 and the outer bead element 144 will together comprise a coaxial bead-on-a-string 150.

As illustrated, one end only of each bead element 144 or 148 of the coaxial bead has been made electrically active, the two active ends being at opposite ends of the coaxial bead. FIGS. 9A and 9B illustrate the means of independently driving the inner and outer elements 144 and 148 in a display device. The two bead components are bipolar and are driven from separate ends of the coaxial bead. The outer bead element 144 is driven by electrodes 152 and 154 disposed upon the faces of a "V" groove 155 which also provides mechanical constraint for the coaxial bead 150. These electrodes 152 and 154 are of an extent just limited to the active region of the outer bead 144 and are some distance from the active end of the inner bead to minimize cross coupling. The inner bead element 148 is driven by an electrode 156 that reaches through the inter-bead gap 158 to attract or repel the electric charge on the said inner bead element. Electrodes 156 provide the added function of maintaining position of the coaxial bead pair 144 and 148 along the string 18. Thusly the inner element 148 and outer element 144 of any of the plurality of coaxial beads 150 are driven independently.

The coaxial bead 150 illustrated in FIGS. 9A and 9B constitutes one picture element of a full color display. The outer element 144 is comprised of four colored glass segments 156, 158, 160 and 162 approximately equally spaced around the perimeter. Of these four perimeter glasses one is clear and one is chosen from the color set of Red, Green and Blue. The other two glass colors are chosen from the set Cyan, Magenta and Yellow. If Blue is one of the colors then the other colors are Cyan and Magenta. If Red is one of the colors then the other two colors are Yellow and Magenta. If Green is one of the colors then the other two colors are Cyan and Magenta.

The inner element 148 of the coaxial bead 150 is comprised of glasses of two colors, one of which is white. The other color is chosen from the set of Cyan, Magenta, and Yellow. If the color Blue is included on the outer element 144 then Yellow is included on the inner element 148 and the visual path can comprise yellow and blue in tandem wherein Black can be presented to a viewer. Similarly if Red is included on the outer element 144 then Cyan is required on the inner element 148 in order to achieve black. Likewise if Green is included on the outer element 144 then Magenta is needed on the inner element 148 for a Black capability. A clear region on outer element 144 and a white region on the inner element 148 allows the color White to be presented to an external viewer. By the combination of colors as described any of the eight principal colors Black, White, Red, Green, Blue, Cyan, Magenta or Yellow is presentable by the picture element defined by the coaxial bead 150.

Figure 10B:
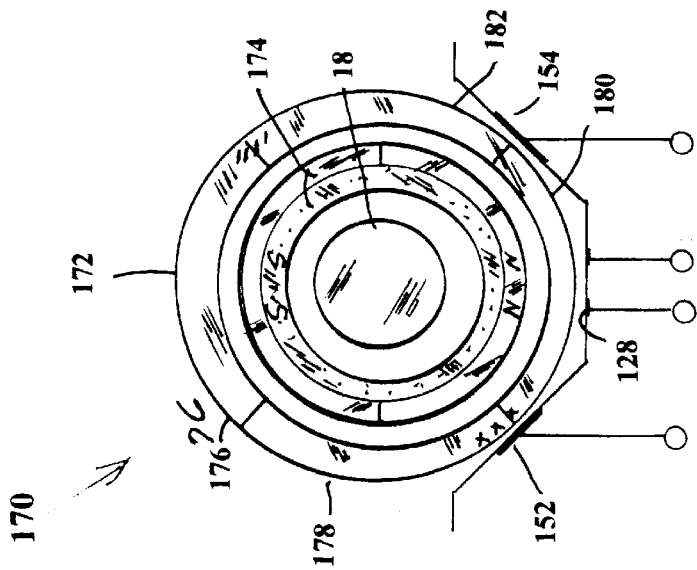
FIG. 10B presents a cross-sectional view of a coaxial pair of beads-on-a-string for an eight-color gamut and illustrating the drive electrodes wherein the inner bead element incorporates magnetic anisotropy.
Figure 10A:
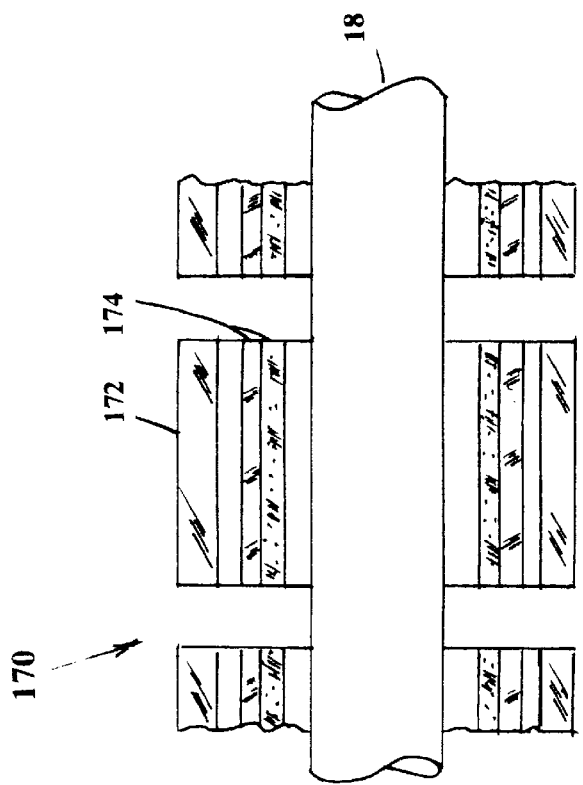
FIG. 10A presents a longitudinal view of a coaxial pair of beads-on-a-string for an eight-color gamut and illustrating the drive electrodes wherein the inner bead element incorporates magnetic anisotropy.

FIGS. 10A and 10B illustrate a string 170 of coaxial beads-on-a-string wherein an outer element 172 is electrically active and driven by signals on electrodes 152 and 154. An inner element 174 is magnetically active and driven by a coil 128. FIG. 10A shows a section view along the length of the string 170, and FIG. 10B presents a cross-section view through one of the coaxial beads. The coaxial bead 170 illustrated constitutes one picture element of a full color display. The outer element 172 is comprised of four colored glass segments 176, 178, 180 and 182 approximately equally spaced around the perimeter. Of these four perimeter glasses one is clear and one is chosen from the color set of Red, Green and Blue. The other two colors are chosen from the set Cyan, Magenta and Yellow. If Blue is one of the colors then the other colors are Cyan and Magenta. If Red is one of the colors then the other two colors are Yellow and Magenta. If Green is one of the colors then the other two colors are Cyan and Magenta.

The inner element 174 of the coaxial bead 170 is comprised of glasses of two colors, one of which is white. The other color is chosen from the set of Cyan, Magenta, and Yellow. If the color Blue is included on the outer element 172 then Yellow is included on the inner element 174 allowing Black to be presented to a viewer. Similarly if Red is included on the outer element 172 then Cyan is required on the inner element 174 in order to achieve black. Likewise if green is included on the outer element 172 then Magenta is needed on the inner element 174 for a Black capability. A clear region on outer element 172 and white on the inner element 174 achieves the color White for an external viewer. By the combination of colors as described any of the eight principal colors Black, White, Red, Green Blue, Cyan, Magenta or Yellow is presentable by the picture element defined by the coaxial bead 170.

Figure 11A:
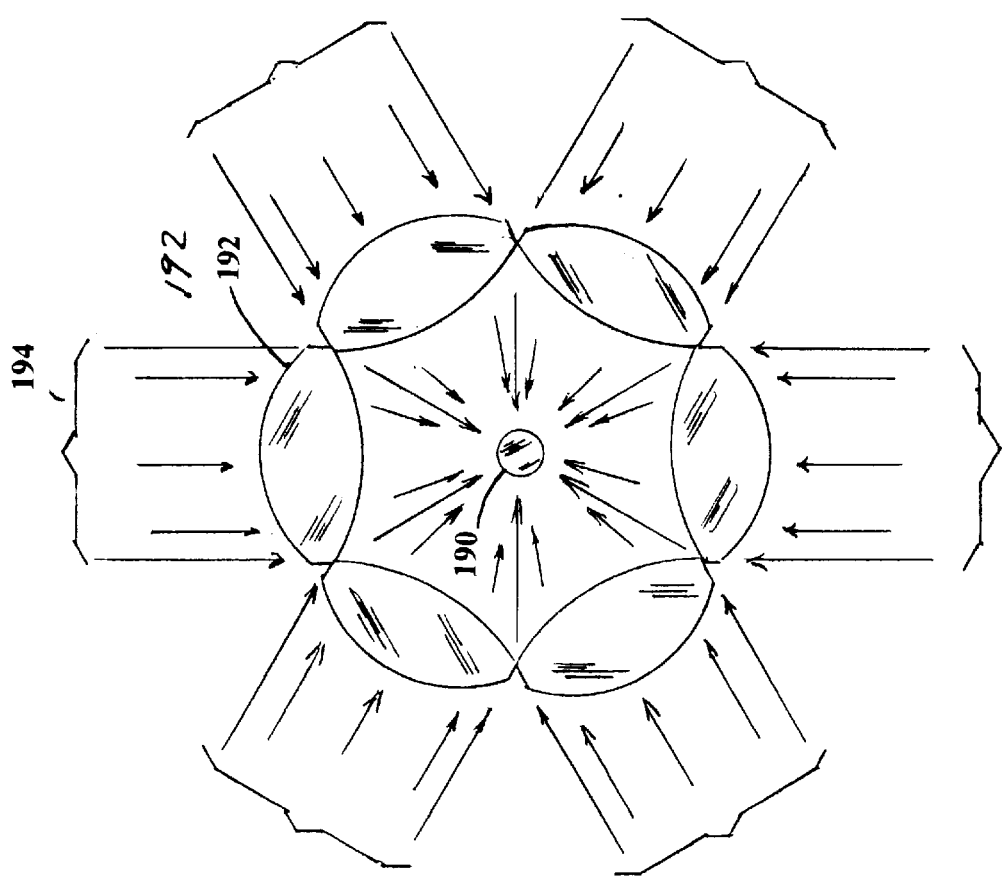
FIG. 11A shows an approach for exposing a photo resist coated fiber with activating light where the fiber is shown along its longitudinal dimension.
Figure 11B:
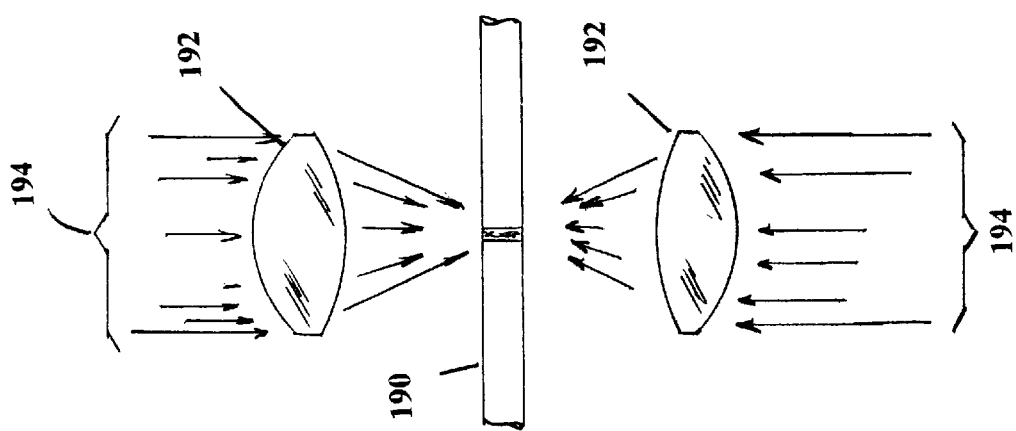
FIG. 11B shows an approach for exposing a photo resist coated fiber with activating light where the fiber is shown in cross-section.

Methods and techniques for etching patterns on glass are well known. Photo resist and etchant materials have been perfected to a high degree. The inventive device described herein relies upon photo etching to achieve a plurality of rings etched into the perimeter of a glass fiber whereby display beads are identified. FIGS. 11A and 11B illustrate one optical approach. Other optical approaches are well known. For example photo resist on fibers on a loom can be exposed by one or more scanning lasers. In FIG. 11A a fiber 190 is passed through a ring of optics wherein the optics are comprised of a plurality of lens elements 192 disposed in an approximate circle about the fiber center. A plurality of collimated optical beams 194, one for each of the plurality of lens element 192, are supplied to the lens elements 192, whereupon they are brought to a focus on the surface of the fiber 190. A photo resist previously supplied to the surface of the fiber can be thus exposed in a plurality of spots around the fiber circumference which taken together comprise a ring of exposure around the fiber circumference. Fiber from a supply spool, not shown, can be coated with photo resist and exposed in the desired pattern. The resist can then be developed and the fiber surface etched to achieve the desired ring pattern.

The present invention addresses the current need for displays in industry and entertainment including specifically high-resolution color displays. Display resolution of interest may range from an 800×600 display with nearly half million-picture elements to a 1600×1200 display with nearly two million picture elements. Higher resolution displays are foreseeable. Fabrication of the present invention can be facilitated by means of manipulating elements of the display as strings of beads-on-a-string. The center string upon which the beads are strung serves to constrain the bead elements both during fabrication and also in the final display device. Utilization of a loom strung with strings of hollow beads-on-a-string and also the utilization of a loom strung with a plurality of spacer fibers orthogonal to the bead fibers facilitate the management of the large number of elements involved in a display and are inventive herein.

The present invention further addresses the need for low power displays that are appropriate for portable displays. The inventive display herein described is not self luminous hence any power source for a portable display need not supply illumination power, which in many state-of-the-art portable displays is the major battery power drain. In general, power is only needed to position a display bead, not to maintain the position.

Figures 12A, 12B:
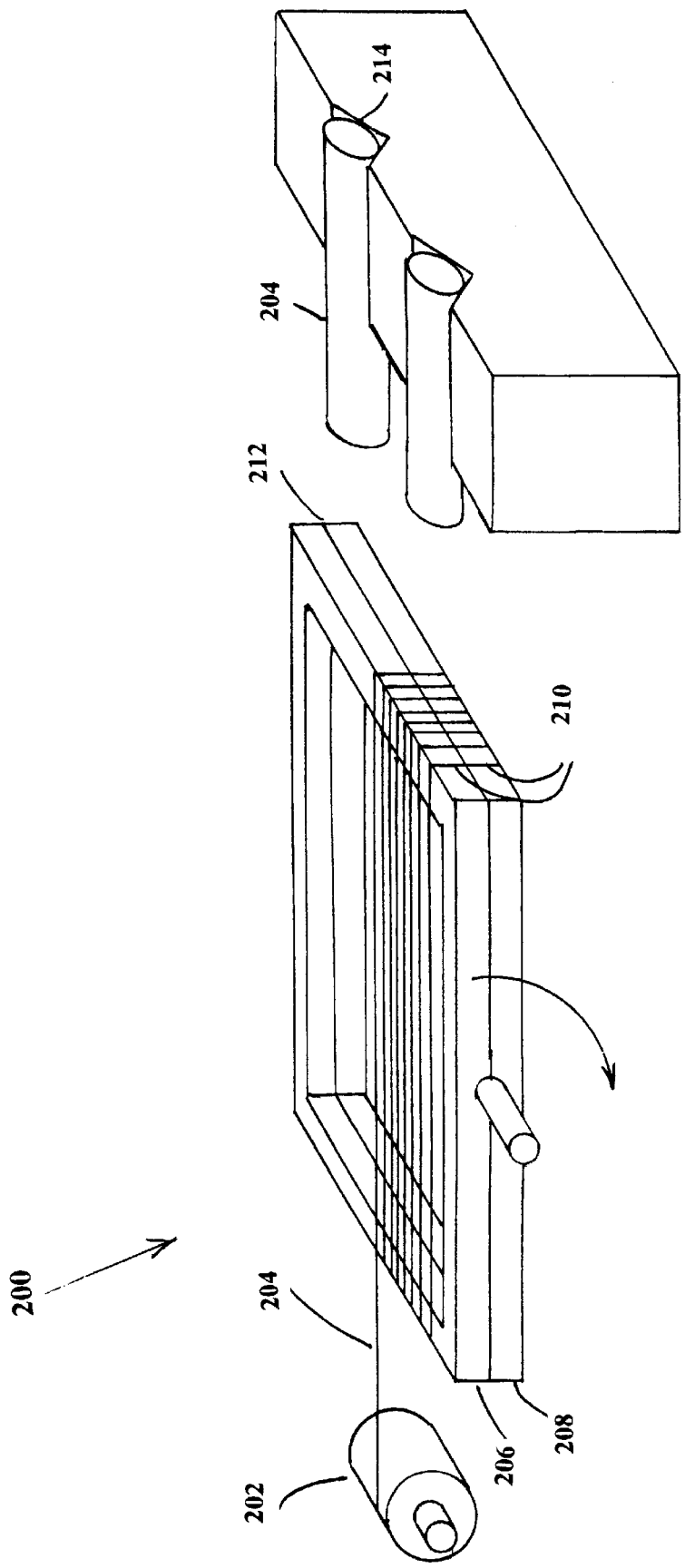
FIG. 12A illustrates winding fiber onto a pair of joined looms.
FIG. 12B illustrates a detail of fibers wound on a loom.

FIG. 12A illustrates the winding 200 of a fiber 204 from a supply spool 202 onto a pair of looms 206 and 208. The fiber 204 can be any one of the fibers that are involved in the fabrication processes. To facilitate winding a pair of looms are joined and wound as a unit. Subsequently the fiber ends are attached to each loom separately as by an adhesive 210 along the loom edges as shown and along edges on the opposite side of the loom, not shown. The fibers can then be cut along cut the loom separation lines 212 and the looms separated to comprise the two looms 206 and 208 each strung with the fiber 204. The looms can be precision-machined frames of fine steel. FIG. 12B shows a detail of fibers 204 in "V" grooves 214 along the loom edges. Precision of fiber spacing is achieved by the accuracy to which the loom is produced. Precision machining is an art which has been perfected for a number of applications, including, specifically the production of optical diffraction gratings. Application of these prior art techniques will allow the production of loom frames having the required precision for the inventive approaches described herein.

Fibers strung on looms can be utilized in two modes in the fabrication of the inventive display device described herein.

In a first mode the fibers strung onto a first loom constrain hollow roller display beads which are strung along the fiber. A second loom is strung with strings of electronics driver circuits as beads-on-a-string. In this mode the strings of beads-on-a-string define a plurality of rows of display elements of the inventive Roller Optical Gate Display Device. These fibers together with the beads with which they are strung remain with and become an integral part of the said display device.

In a second utilization mode, looms strung with tooling fibers are utilized to define and maintain display element position in columns orthogonal to the row defining strings of display beads. Looms of fibers utilized in this second mode do not remain with the said display device but are tools used in fabrication. Each intersection of the orthogonal fibers defines a display element position.

By means of fibers utilized in the said two modes the registration of display beads in rows and columns can be defined and controlled by the precision with which the fibers are strung on the looms. The looms can be manufactured with the high degree of precision needed thus facilitating accurate placement of the many thousands of display beads gates required by the inventive Roller Optical Gate Display Device. Display beads can by this means be manipulated as strings of beads-on-a-string and looms of strings of beads-on-a-sting as opposed to manipulating individual beads.

Electronics is ubiquitous to modem electronics. Silicon circuits having many hundred thousand transistors are common in the industry. In the case of electronic disc, however, several unique requirements exist. Commonly, a circuit comprising a few transistors must be positioned physically close to each of the many display elements. In producing drive circuits for each of the needed several thousand or hundreds of thousand display elements a number of defective transistors can be anticipated. Poor display performance will result unless the defective units can be detected and replaced with known good units. The inventive approach herein described whereby strings of electronics circuits are utilized as beads string loosely on a thread allows a known defective circuit unit to be removed and replaced with a known good unit by removing the defective unit and sliding the circuits along the string by one position, making use of redundant circuits on the string.

A preferred electronics approach that utilizes an economical amount of material is one similar to that proposed in my U.S. Pat. No. 6,127,725, "THIN FILM ELECTRONICS ON INSULTOR ON METAL", and which is hereby incorporated in this present patent application by reference.

In the referenced approach, islands of thin films of fused silica are developed on a refractory metal foil such as tungsten. Silicon can then be formed upon the fused silica glass and processed into the required electronic circuits. By these means an area of islands of circuits can be developed on a thin refractory metal foil, wherein there is one circuit for each display element and wherein there is included extra circuits to accommodate the replacement of circuits that might be identified as defective. Utilization of state-of-the-art techniques enables the generation of islands of circuits over large areas to the required registration.

Figure 13A:
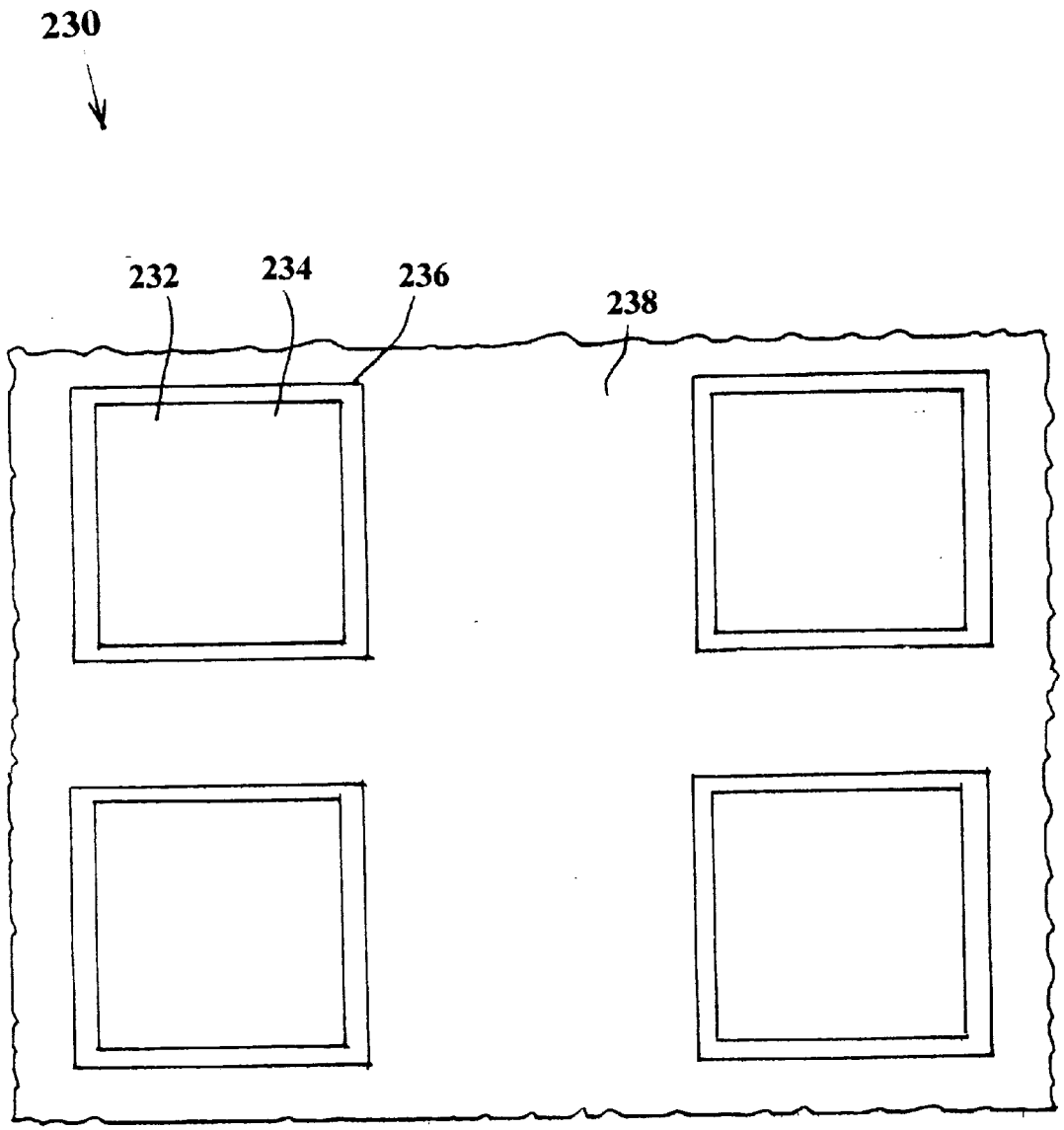
FIG. 13A shows a plan view of islands of silicon electronics on silicon-on-fused silica-on tungsten foil.
Figure 13B:
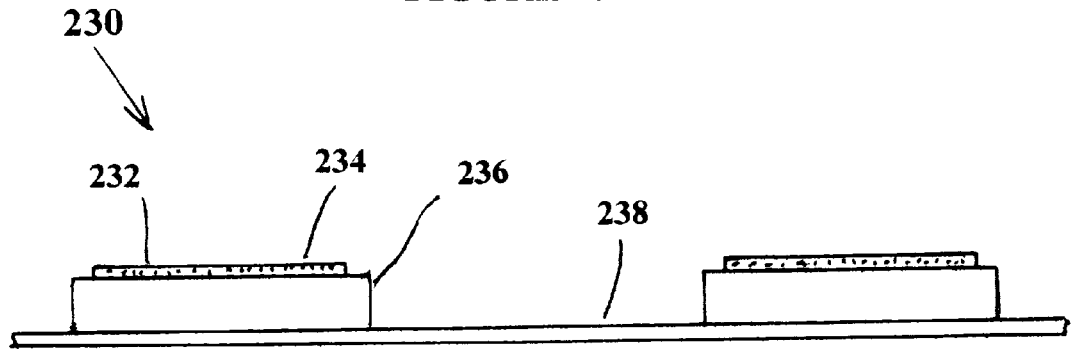
FIG. 13B shows an elevation view of islands of silicon electronics in silicon-on-fused silica-on tungsten foil.

FIG. 13A illustrates an array 230 of islands 232 of silicon 234 on fused silica 236 on refractory metal 238. In the preferred approach the refractory metal is tungsten and is a thin foil. Display driver electronics, not described separately from the silicon, 234 are developed in the silicon by conventional means. The selected materials are compatible with the high process temperatures needed for producing and processing the highest quality silicon and silicon electronics. FIG. 13B illustrates a cross-section view of the silicon-on-insulator-on-foil. At this stage defective circuit elements 232 can be identified and tagged for later removal.

Figure 14A:
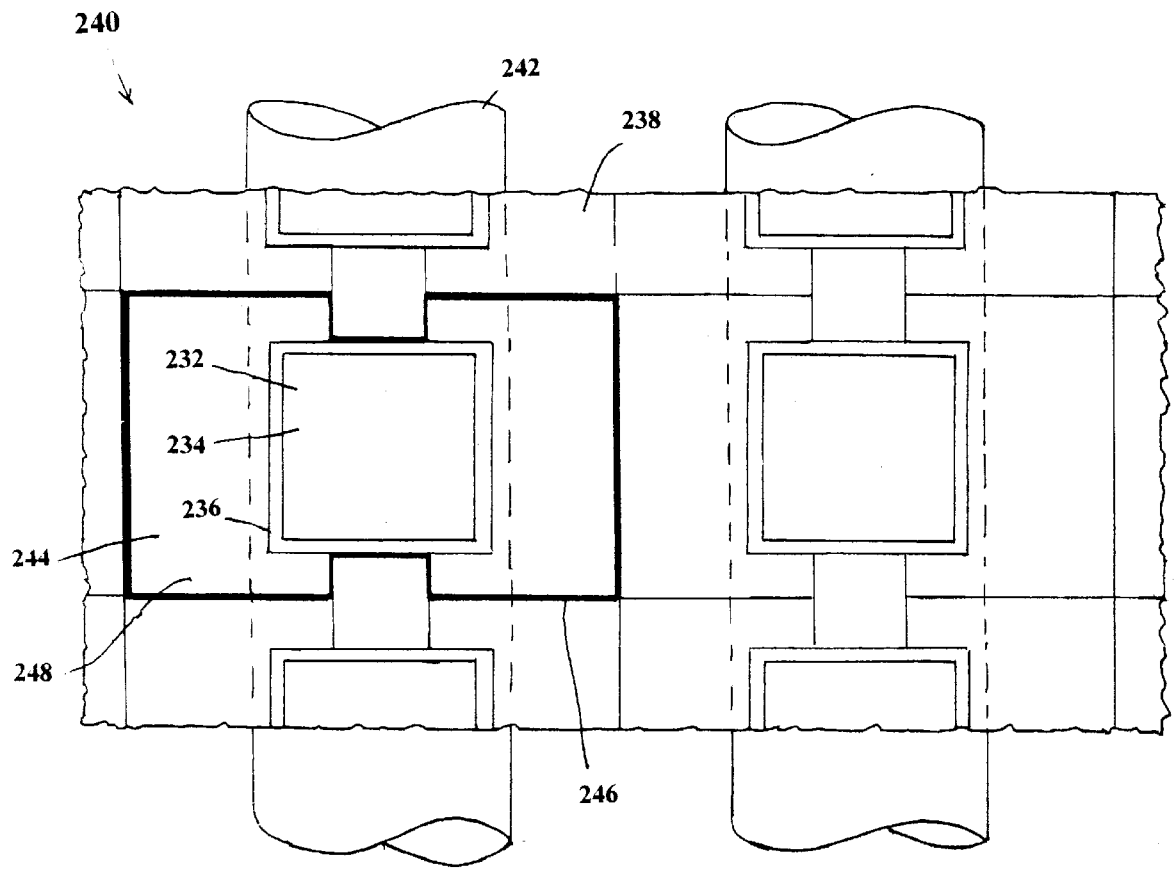
FIG. 14A illustrates circuits on foil positioned relative to support fibers on a loom ready for cutting into individual circuits.
Figure 14B:
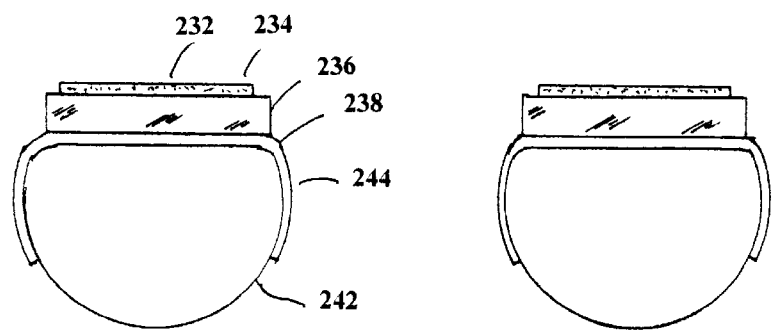
FIG. 14B illustrates circuits on foil loosely attached to support fibers after being cut free and by folding portions of tungsten foil around the fibers.

FIGS. 14A and 14B illustrate an arrangement 240 for cutting free the islands 232 of silicon electronics on-glass-on-metal foil into a plurality of individual circuit elements 234, one for each of the plurality of display beads, the display bead 38 in figure shown in FIG. 3A being typical. Well-known processes that make use of photo-optical methods can be utilized to produce the driver silicon electronics in the silicon. In FIG. 14A the extensive area of islands of silicon electronics 234 are shown aligned to a plurality of fibers 242 strung on a loom, not shown. Element placement accuracy of circuit islands 232 on the metal foil 238 is controlled by the high precision of the photo masks utilized in the generation silicon electronic islands on metal foil. Precision placement of the fibers 242 is controlled by fiber placement in precision "V" grooves in a loom, not shown. By these placement means row and column placement accuracy of circuits can be assured. The said loom can be a fabrication tool machined to high precision assuring precision of fiber placement. While the fibers 242 remain with and become an integral part of the inventive display device, the looms upon which the said fibers are strung do not.

As illustrated in FIG. 14B each of the plurality of fibers 242 exhibits a "D" shaped cross-section that includes a flat portion for maintaining flatness of the brittle refractory glass 236 and silicon 234. After aligning to the plurality of fibers 242 the foil born islands of silicon electronics 232 are cut by a tool into individual circuit elements. The cut line 246 in FIG. 14A indicates the cut pattern for a single circuit. This pattern includes provision for positioning the circuit element correctly on a fiber 242. As the circuits are cut portions 244 of the foil substrate 238 is folded to wrap loosely around a fiber 242. The circuits are developed at the nominal positions of a display element in the said display device. As the foil 238 is cut, a portion 248 is included whereby circuit bead position is maintained on the string fiber 242.

At this stage any circuit elements 232 that have been identified as defective can be removed. The row of circuit elements 232 along the effected fiber 242 can then be advanced one position, filling the gap left by the removed defective element, advantage being taken of redundant circuit elements 232. A plurality of electronic driver circuits is now configured in rows and columns on the "D" fibers 242 on the loom, not shown. By the above described processes the plurality of driver circuit element 234 are positioned correctly to integrate with the plurality of display microcylindrical elements, each of which comprises a single element of the roller optical gate display device.

Figure 14C:
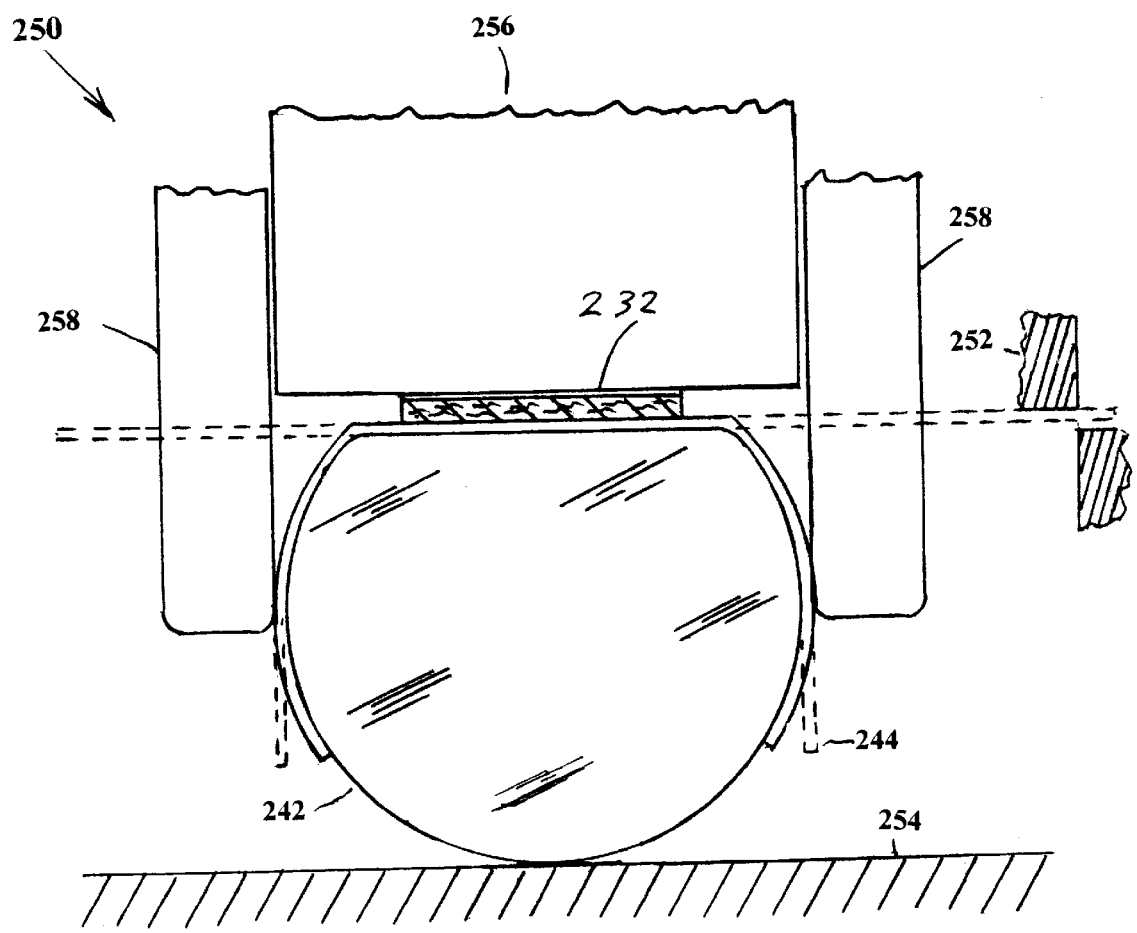
FIG. 14C presents a detail of cutting the circuit bearing tungsten foil and bending portions of foil the loosely around a support fiber.

FIG. 14C illustrates a tool 250 for cutting circuit elements 232 free and for simultaneously folding a portion of the refractory metal 238 loosely about a "D" fiber 242. Cutting is accomplished while the loom of fibers is constrained between tooling surfaces 254 and 256 and cutters 252 accomplish the cut. Folding of the metal foil 244 loosely about the "D" fiber 242 is accomplished by tabs 258 on the tool 250. In application a row of cutting tools 250 can extend over the loom of fibers with one cutting tool along each "D" fiber 242. As the row of cutting tools 250 moves over the said loom each of the plurality of electronic circuits on the foil can be cut free and loosely attached to a "D" fiber 242. Tabs 248 left on the metal foil as it is cut can provide for correctly positioning circuit elements 232 along fibers 242. The loom along with the plurality of "D" fibers 242 and the plurality of electronic circuits now comprises a subassembly 268, as will be indicated in a later figure, and is ready for a subsequent assembly step.

Figure 15A:
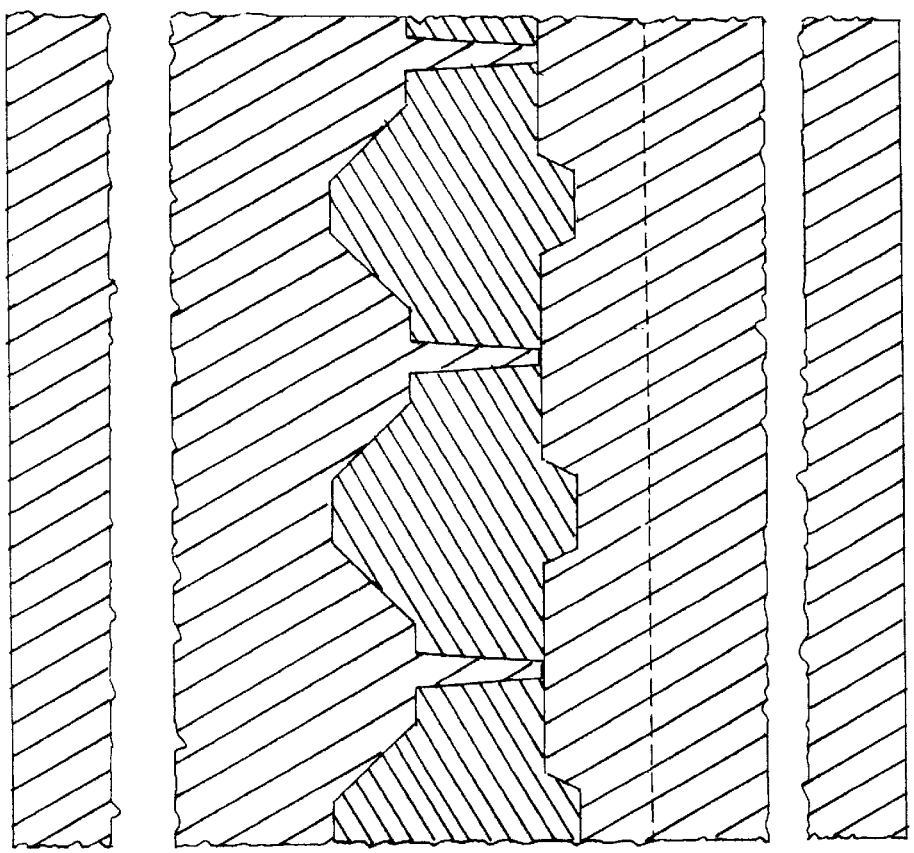
FIGS. 15A and 15B illustrate orthogonal views of a molded display substrate still within the mold halves.
Figure 15B:
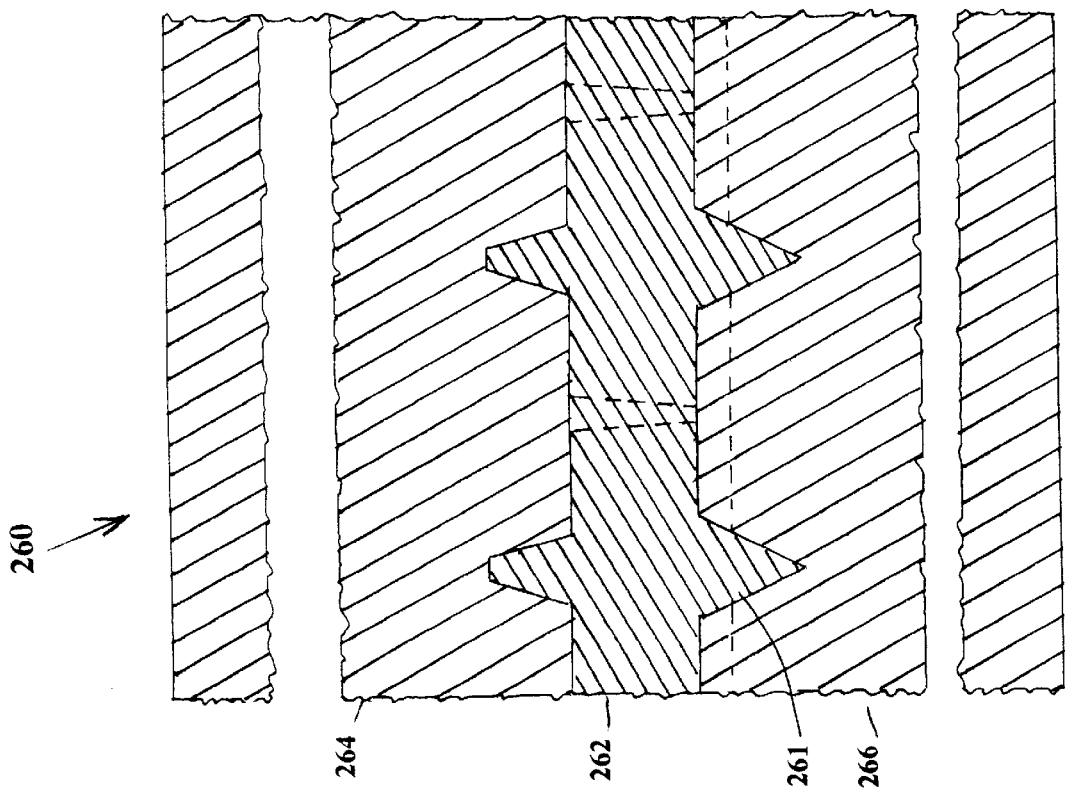

FIGS. 15A and 15B illustrate orthogonal views 260 of a display substrate 262 as molded between an upper mold half 264 and a lower mold half 266. Mold halves 264 and 266 are precision parts capable of producing a display substrate 262 of the required shape and precision. The mold halves are production tools and do not become part of the inventive display device.

A next fabrication step can comprise removal of the lower mold half 266 which has defined the driver face 261 of the molded substrate 262. Interconnection metal can then be deposited on the exposed face 261 of the molded substrate 262 using well-known methods. The metalization on this substrate surface can serve the same function as metalization on a circuit board in typical electronic assemblies wherein conductive traces supply signal and power to individual circuits. This metalization provides conductive leads to supply: power voltage, synchronization and signal to the driver electronics circuits 234 on the silicon islands 232 that will contact the metal. An interconnection jack, not shown, can be molded into the substrate 262 and remains integral with the substrate. By means of the interconnection jack display information is presented for display to an observer.

Figures 16A, 16B:
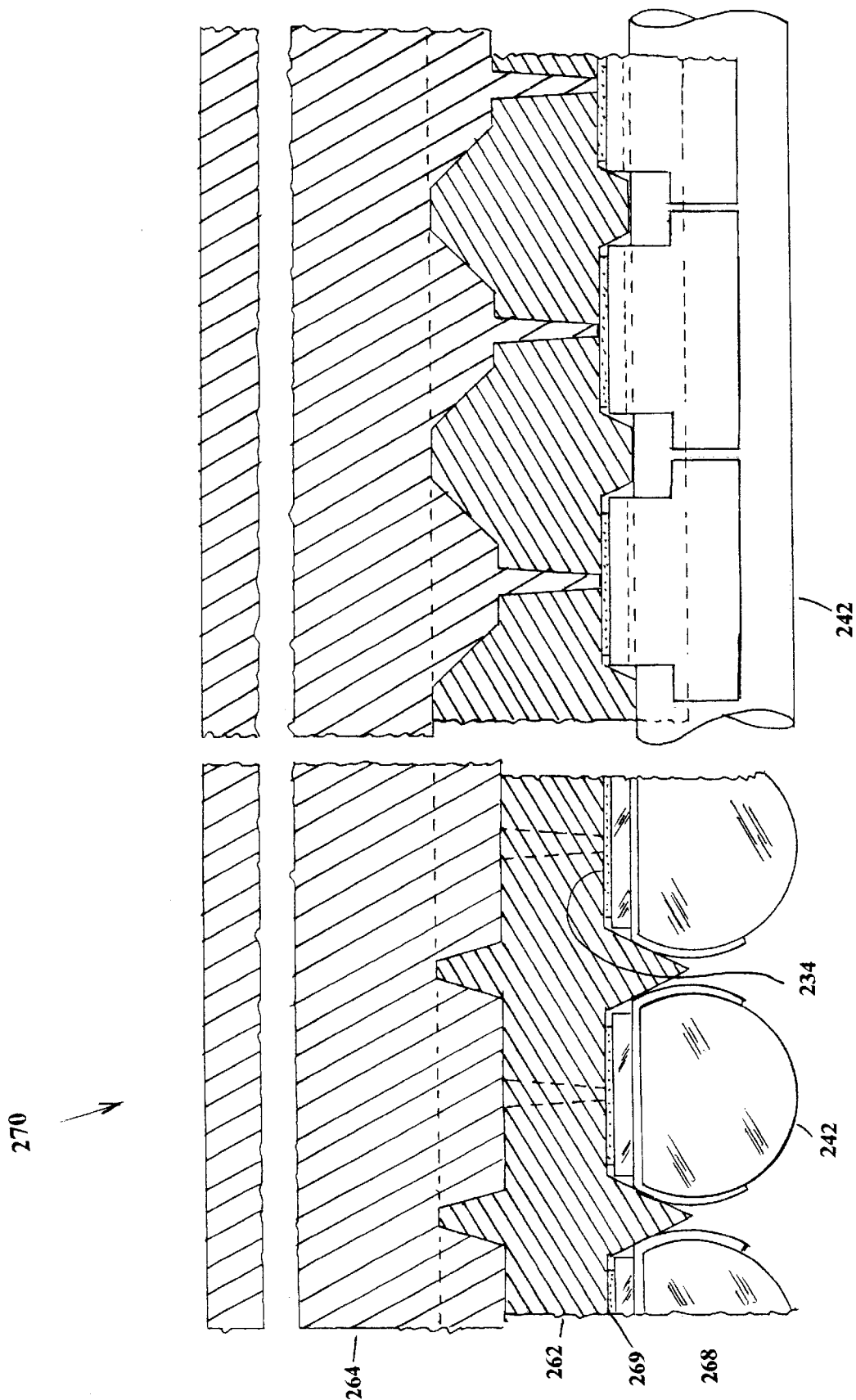
FIGS. 16A and 16B shows orthogonal views of electronics circuit beads-on-a-string assembled to a molded substrate with one-half of the mold still in place.

FIG. 16A and 16B illustrate orthogonal views 270 of a subassembly 268 integrated with the lower half of the molded substrate 262. Utilizing a kinematic assembly tool 340, not shown but to be described later, the loom of "D" fibers 242 holding electronic driver circuits 234 that comprises subassembly 268 can be aligned and integrated with the lower face 261 of the substrate 262 while the substrate is still attached to the upper mold half 264. Performance of this assemble step while the substrate 262 is still mated to the mold-half 264 assures structural integrity of the substrate.

FIGS. 17A and 17B illustrate orthogonal views of a subassembly 280 at a late stage of assembly. As indicated the "D" fibers of subassembly 268 have been encapsulated and bonded to substrate 262 by encapsulation 282. With the thin substrate 262 thus stabilized by the encapsulation 282, the upper mold half 264 has been removed. A photo resist 278 has been applied and developed into a pattern for metalization of the upper surface 276 of the substrate 262. FIGS. 17A and 17B illustrate the deposition of metal 284 for the metal pattern. The said metalization 284 establishes electrodes for attracting or repelling electro-magnetic active areas on the surface of roller optical gate elements, typically the bead-on-a-string 38 illustrated in FIG. 3A. The said metalization 284 can include coverage of the internal surfaces of connectivity vias 286 whereby electrical connection can be established to a drive connection point 288 which has been developed as part of the drive electronics circuit developed within the silicon 234. Similarly the patterned metal can include conductive traces to generate magnetic fields for positioning beads having magnetic anisotropy. At this stage the display substrate 262 and the electronics subassembly 268, along with the encapsulation 282 will comprise a robust subassembly 280.

Figures 18A, 18B:
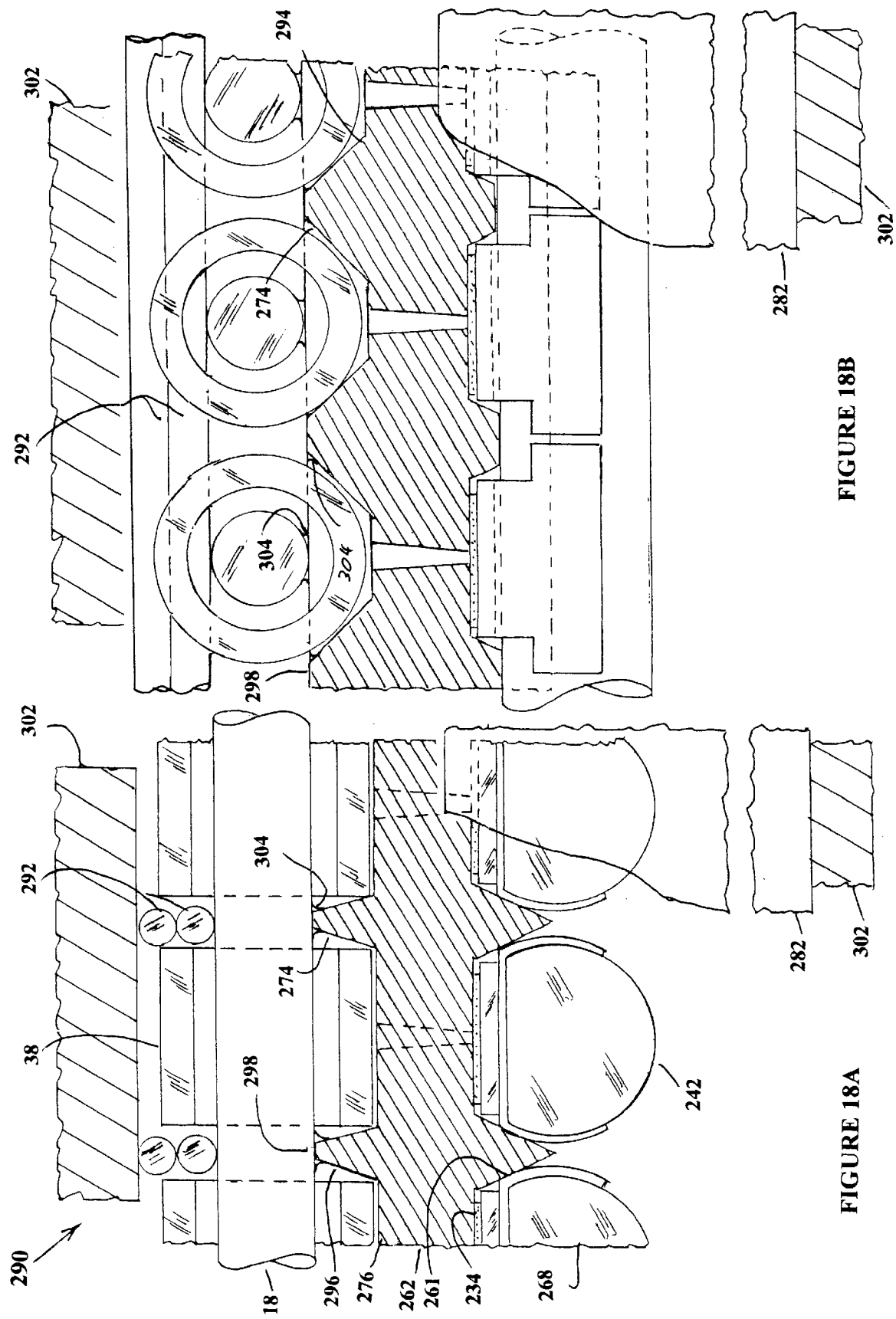
FIG. 18A and 18B show views orthogonal of still later assembly step.

Fabricating of the display device may be facilitated by means of a loom containing a plurality of proto beads-on-a-string, of which proto bead 34, shown in FIG. 2C is typical. At this stage the proto beads will not as yet have been freed from the core 18 of the fiber 10 with which they were drawn from the preform 12. The fiber 30 strung with proto beads, as described, typically, by FIG. 2C, can be been wound onto a loom typically 206 as illustrated in FIG. 12A. While on this first loom a second or tooling loom, also typically 206, strung with spacer fibers 292 can be integrated to the fibers 30 on first loom 206 as illustrated in FIG. 18A. The spacer fibers 292 of this second loom are orthogonal to fibers 30 of the proto beads 34. During integration spacer fibers 292 occupy the notches 32 left in the string 30 of proto beads 34. Registration is assured by the precision with which the looms have been constructed. At this stage the soluble glass 14 can be dissolved by chemical action, freeing the beads that then become beads-on-a-string of which bead 38 shown in FIG. 3A is typical. Display bead registration accuracy in rows and columns are assured by the precision of machining of the looms 206.

As illustrated in FIGS. 18A and 18B, the two-loom subassembly of beads-on-a-string, typically bead 38 in FIG. 3A, and tooling fibers 292, can next be assembled and integrated with the growing display device assembly. This growing assembly now is comprised of the metalized substrate 262 including both its lower surface 269 and its upper surface 276, the subassembly 268 comprised of a plurality of "D" fibers 242 each with its plurality of silicon electronic circuits 234, and the lower encapsulation 282. The upper surface of substrate 262 has been molded to include a plurality of shallow cavities 274 within which the plurality roller optical gate beads, typically 38 of FIG. 3A, are to be contained by a window, not shown. These cavities 274 are implementable by a plurality of orthogonal ridges 294 and 296 molded into the upper face 276 of the substrate 262. The ridges would be molded to have a common depth and to be smooth and flat on the outermost surface 298. Prior to integration the ridge surfaces 298 can be contacted with a surface wet with an adhesive. Upon integration of the loom of strings-of-beads-on-a-string the wetted ridge surfaces 298 contact the lower surface of the central core fiber 18 wetting the said surface with the adhesive. Positive contact with core fiber 18 can be established by pressing the subassemblies together between a pair of tooling anvils 302. Contacts between the core fiber 18 and the ridge surfaces 298 can be assured by the combined diameters of the tooling fibers 292. The adhesive material with which the surfaces are wetted form fillets 304 at the points of contact. At a later stage in the assembly the adhesive is cured providing a bond between each display bead along both the rows and columns of the display device.

Figures 19A, 19B:
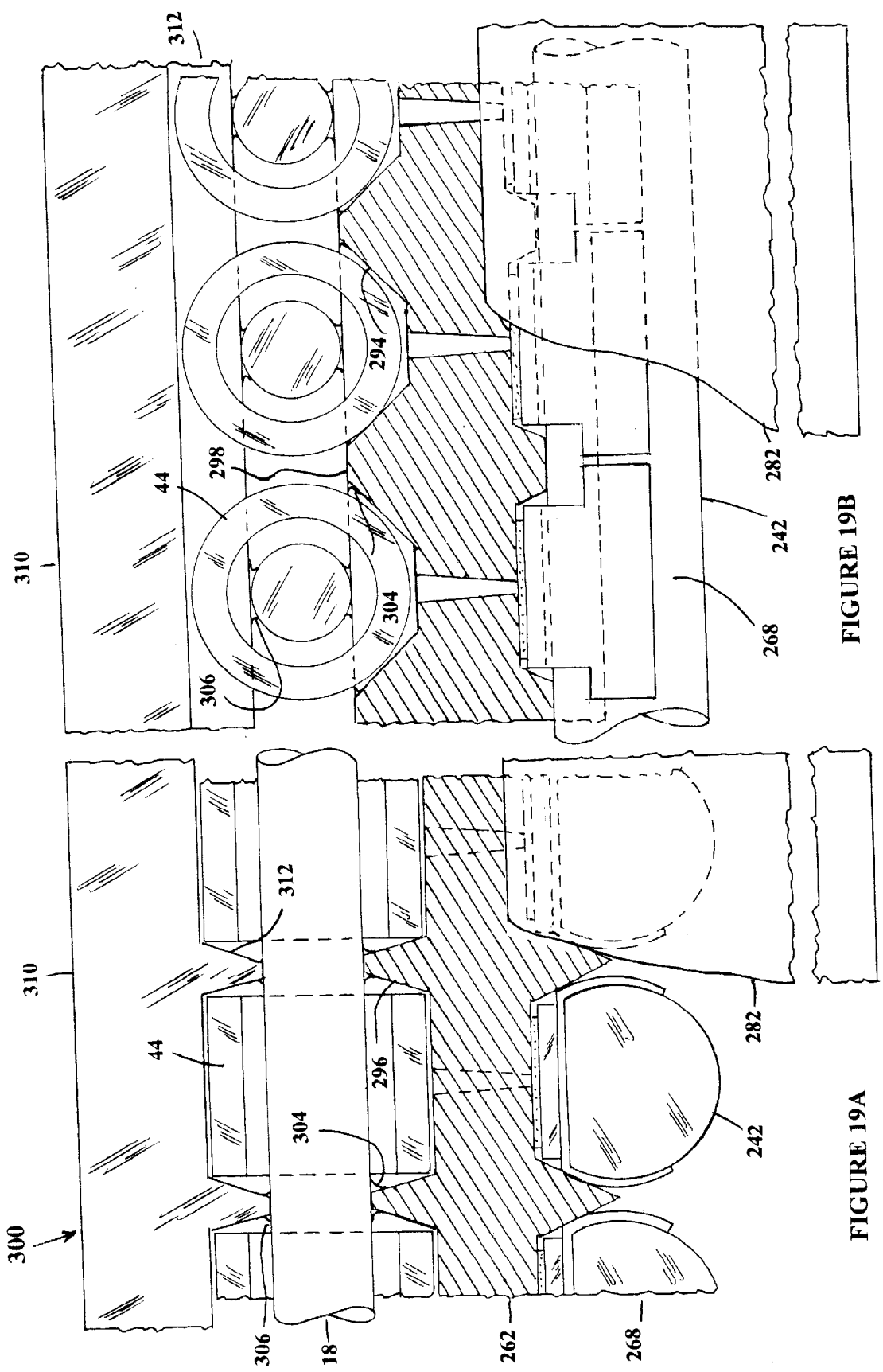
FIG. 19A illustrates a longitudinal view of micro-cylinder beads-on-a-string assembled to comprise a display device.
FIG. 19B illustrates a cross-sectional view of micro-cylinder beads-on-a-string assembled to comprise display device.

A final assembly step 300 can be the assembly of a transparent window 310 as illustrated in the orthogonal views presented by FIGS. 19A and 19B. As illustrated in FIGS. 19A and 19B "D" fibers 242 and the fibers of strings of beads-on-a-thread, typically 44 in FIG. 3B, are, preferably, mutually orthogonal. Window 310 is produced to have a plurality of ridges 312 that match at least some of the ridges 296 and 298 on the upper surface of substrate 262. Prior to assembly of window 310, these said ridges 312 are wetted with an adhesive. Upon assembly the wetted ridges 312 contact and wets points of contact with the upper surface of the central fiber 18, forming fillets 306 at the contact points.

When in a final step the adhesive on upper and lower surfaces of the central fiber 18 is cured, as by ultraviolet light, a mechanical bond can be established between the upper window 310 to the central fiber 18 and thence to substrate 262 at contact points adjacent to the fillets 304 and 306. Since the substrate 262 will have been encapsulated including the driver subassembly 268, a secure mechanical connection is established from the window 310 through the central fiber 18 to the substrate and thence to the driver subassembly 268 and the driver encapsulation 282. By means of the mechanical connections a secure connection can be established at intersections of the upper fibers of display beads-on-a-string item, 38 of FIG. 3A being typical, with the lower fibers 242 containing driver electronics. The said two sets of fibers can be orthogonal. The bonds at the intersections provide a robust structure very similar to a weaving of warp and weft fibers.

Figure 20A:
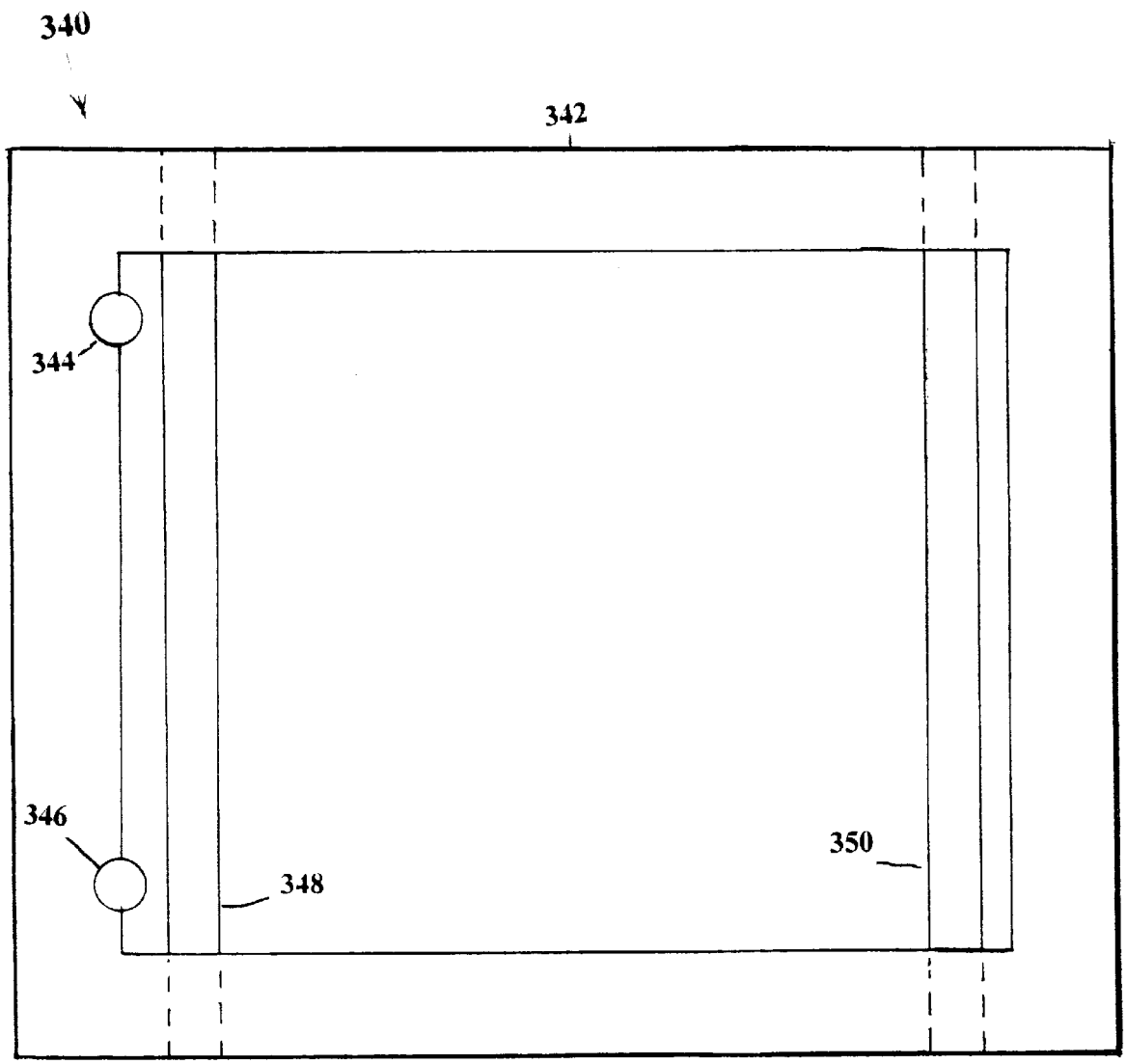
FIG. 20A illustrates a plan view of a kinematic mold frame.
Figure 20B:
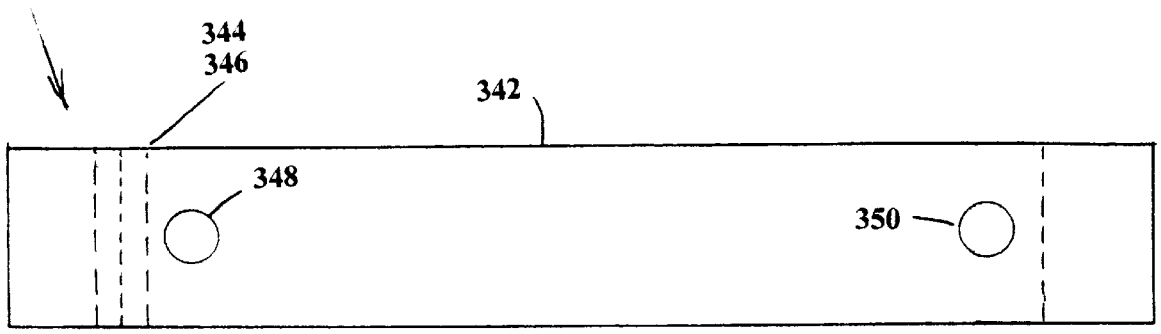
FIG. 20B shows an elevation view of a kinematic mold frame.
Figure 21A:
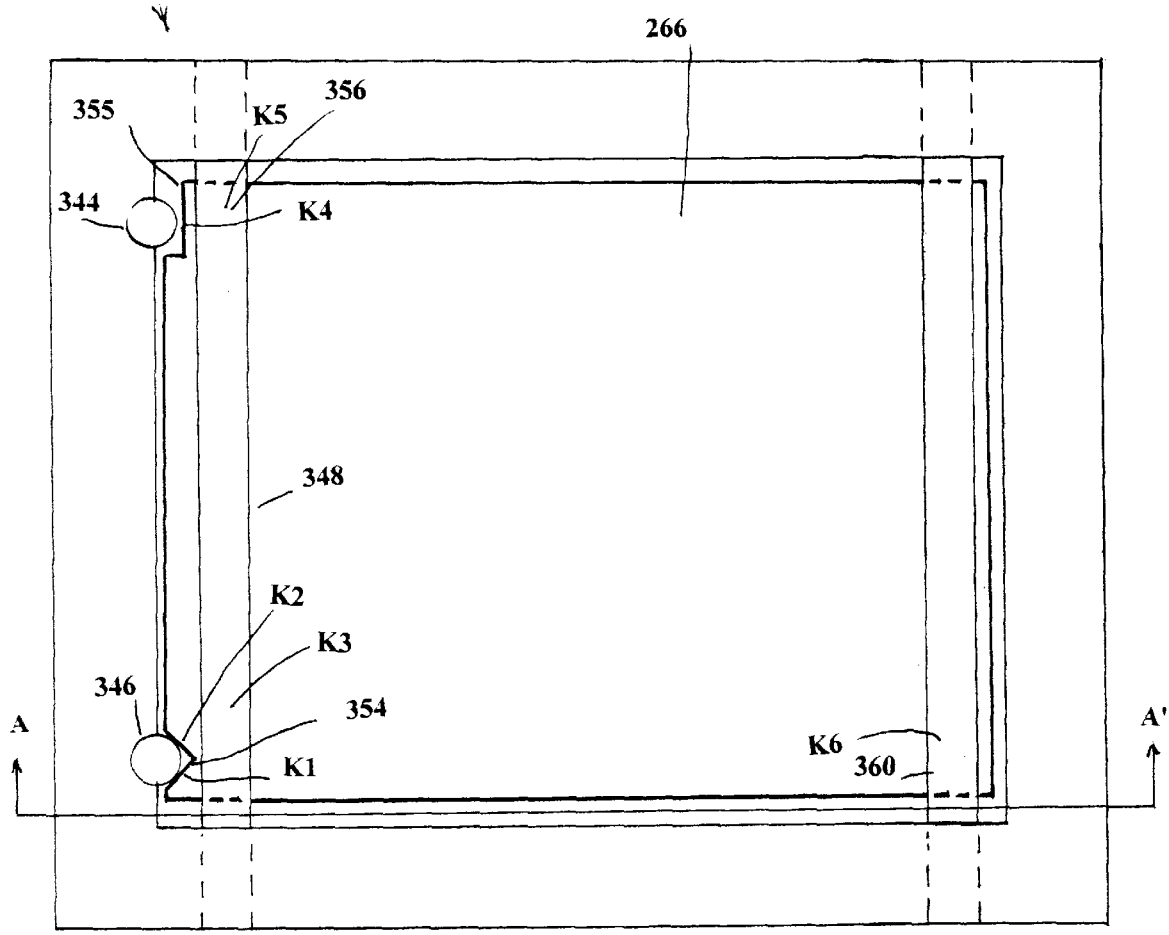
FIG. 21A is a plan view showing a subassembly kinematically integrated with a mold frame.
Figure 21B:
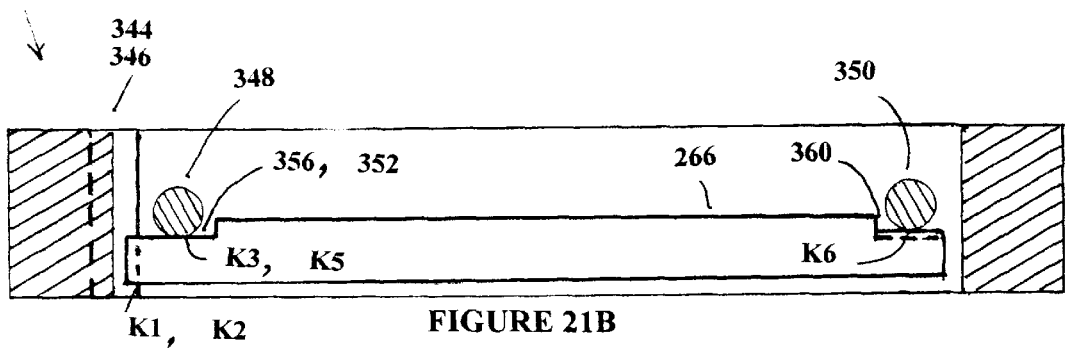
FIG. 21B is an elevation view showing a subassembly kinematically integrated with a mold frame.
Figure 21C:
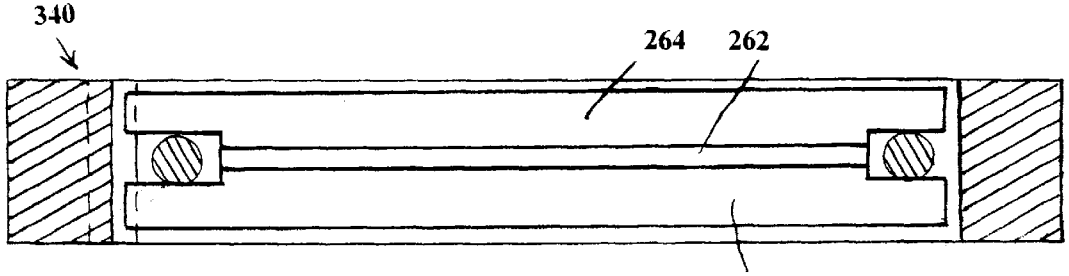
FIG. 21C is an elevation view showing upper and lower subassemblies kinematically integrated with a mold frame.

FIGS. 20A and 20B illustrate plan and elevation views of a kinematic assembly frame 340 that can serve as an assembly tool. This frame is comprised of a hollow rectangular frame 342 and four rods, 344, 346, 348 and 350, all of which are fabricated and assembled to a high degree of precision. The rods establish kinematic references whereby both the upper mold half 264 and the lower mold half 266 are positioned with the accuracy needed for the molding and assembly processes discussed herein as the preferred fabrication procedure. The primary fabrication steps, including molding of the substrate and the integration of various subassemblies with the substrate can be performed within this frame. FIGS. 21A, 21B and 21C illustrate kinematic positioning of the upper mold half 264 and the lower mold half 266 for molding of the display device substrate 262.

It is well known that kinematic positioning of a mechanical part requires that the part be constrained in six degrees of freedom. The six-degree of freedom constraint requirement is met if the part is contacted at six points, each of which provides constraint in one unique degree of freedom.

FIG. 21A and 21B illustrate kinematic constraint for the lower mold half 266. Six flat surfaces on the lower mold half 266 contact six surfaces of rods 344, 346, 348 and 350 which are integral with frame 340 whereby the required six degree of freedom constraints are established. A "V" groove 354 in the lower mold half 266 comprised of two flat vertical surfaces contacts rod 346 at two points, K1 and K2; a horizontal flat surface 352 contacts rod 348 at a single point, K3; a vertical flat surface 355 contacts rod 344 at a single point K4; a second horizontal flat surface 356 contacts rod 348 at a single point K5; and finally a horizontal flat surface 360 contacts rod 350 at a single point K6. As the lower mold half 266 is held against the six constraint points K1, K2, K3, K4, K5, and K6 the mold half is positioned very precisely relative to the frame 342. Commonly, kinematic positioning of a mechanical piece allows the piece to be removed and replaced a number of times and the positioning each time is accurate to within a wavelength of light as indicated by optical interferometry.

The upper mold half 264 is also positioned by kinematic constraint. The necessary and sufficient six constraint points are exactly analogous to the six constraint points as described for the lower mold half 266 and are not described separately.

With the upper and lower mold halves 264 and 266 in place in the kinematic frame 340 the display device substrate 262 can be molded. The lower surface of the molded substrate conforms to the lower mold surface as kinematically constrained, and the upper surface of the molded substrate 262 conforms to the upper mold surface.

As the preferred approach proceeds for assembly of the inventive display device, the said mold halves 264 and 266 are successively replaced with various subassemblies as described above. As each subassembly is integrated to the mold and hence the growing assembly of the display device it is positioned against the given six degree of freedom constraint points as earlier described whereby precise registration is assured. By this means assembly at every step is controlled by kinematic positions relative to the common frame 340 and precise registration is assured.

Using the assembly tools comprised of precision looms, 206 being typical, and the kinematic assembly frame 340 as described the several hundred thousand display elements can be accurately registered over the display and aligned to their individual driver electronic driver circuits.

Prior to final closing the voids within the assembly are filled with an electrophoretic active liquid.

While the invention has been described in conjunction with specific embodiments, it is evident to those skilled in the art that many alternatives, modifications, and variations will be apparent in light of the foregoing description. Accordingly, the invention is intended to embrace all such alternatives, modifications and variations as fall within the spirit and scope of the appended claims,

What is claimed is:

1. Apparatus comprising a substrate having a first surface and a second surface, the two surfaces being substantially parallel and substantially parallel to a transmissive window disposed facing the first surface of said substrate and separated from said first surface by a gap, a plurality of at least one string of display beads-on-a-fiber disposed between said substrate first surface and said transmissive window wherein said beads are disposed in at least one row and at least one column each display bead having an anisotropy for providing at least one electromagnetic dipole moment rendering said display bead electronically responsive, a rotatable disposition of each said display bead being achievable while said display bead is thus disposed between said transmissive window and said substrate first surface, each display bead, when rotatably disposed between said transmissive window and said substrate being disposable in any one of a plurality of at least two rotatable orientations with respect to said transmissive window, each said display bead providing a plurality of unique optical modulations, one for each of said plurality of at least two rotatable orientations, electrode means disposed on first substrate surface adjacent to each said display bead, connectivity means whereby when an electric signal is connected to said electrode means an electromagnetic field results which tends to rotate said display bead into alignment with the field.

2. The apparatus of claim 1 wherein said connectivity means is further comprised of connectivity paths between said first and second surfaces of said substrate whereby signals supplied by electronic circuit means disposed on said second substrate surface are connected to electrode means disposed on said substrate first surface adjacent to each of the said plurality of display beads.

3. The apparatus of claim 2 wherein said electronic circuit means comprises a plurality of islands of silicon-circuits-on-insulator-on-metal-foil.

wherein a portion of metal foil wraps at least partially around a fiber wherein the said plurality of circuit islands are disposed as a plurality of at least one string of circuit beads-on-a-fiber and, wherein the said circuit islands are disposed in at least one column and at least one row and, wherein there is a mechanical attachment between the said plurality of at least one string of circuit beads-on-a-fiber and the substrate.

4. The apparatus of claim 3 wherein said plurality of said at least one string of circuit beads-on-a-string disposed on said substrate second surface are orthogonal to the plurality of said at least one string of display beads-on-a-string disposed on said substrate first surface and, wherein a plurality of mechanical bonds exist between said substrate first surface and said strings upon which said plurality of display beads are strung and, wherein a plurality of mechanical bonds exist between said fibers upon which said display beads are strung and said transmissive window whereby a plurality of mechanical bonds exist between said transmissive window and substrate first surface and wherein said display beads when rotatably disposed between the transmissive window and substrate first surface and strung upon the said plurality of fibers are free to rotate as induced by an electromagnetic field.

5. The apparatus of claim 4 wherein a plurality of metal traces are disposed on said substrate second face whereby electric signal and power are distributable to said circuit islands and to said electrode means adjacent to said plurality of circuit beads-on-a-fiber and wherein connectivity means are further disposed on said substrate whereby electric signal and power from an external source are connectable to said plurality of metal traces.

6. The apparatus of claim 5 wherein at least one bead of the said plurality of at least one string of display beads-on-a-fiber possesses electric anisotropy resulting from triboelectric activity and electrophoretic activity in combination whereby electric dipole moments result whereby voltage signals supplied to said electrode means develop voltage fields whereby said display beads tend to rotate to positions wherein said dipole moments tend to align with said fields.

7. The apparatus of claim 5 wherein at least one bead of the said plurality of at least one string of display beads-on-a-string possesses electric anisotropy resulting from triboelectric activity whereby electric dipole moments result whereby voltage signals supplied to said electrode means develop voltage fields whereby the display beads tend to rotate to positions wherein said dipole moments tend to align with said fields.

8. The apparatus of claim 5 wherein at least one bead of the plurality of the at least one string of display beads-on-a-fiber possesses electric anisotropy resulting from electrophoretic activity whereby electric dipole moments result whereby voltage signals supplied to said electrode means develop voltage fields whereby the display beads tend to rotate to positions wherein said dipole moments tend to align with said fields.

9. The apparatus of claim 5 wherein at least one bead of the plurality of the at least one string of display beads-on-a-string possesses magnetic anisotropy resulting from magnetic activity whereby a magnetic dipole moment results whereby magnetic dipole moments result whereby voltage signals supplied to said electrode means develop magnetic fields whereby said display beads tend to rotate to positions wherein said dipole moments tend to align with said fields.

10. The apparatus of claim 5 wherein at least one bead of the plurality of the said at least one string of display beads-on-a-fiber comprises a coaxial pair wherein said coaxial bead is composed of an outer component within which a smaller inner component is nested wherein the inner component circumscribes the string and the outer component circumscribes the inner component and wherein both said bead components have electric anisotropy resulting from triboelectric activity and electrophoretic activity in combination whereby electric dipoles result whereby voltage signals supplied to said electrode means develop voltage fields whereby said display bead components tend to rotate to positions wherein the dipole moments align with said fields.

11. The apparatus of claim 5 wherein at least one bead of the plurality of the at least one string of display beads-on-a-fiber comprises a coaxial pair wherein each coaxial bead is composed of an outer component within which a smaller inner component is nested wherein the inner component circumscribes the said fiber and the outer component circumscribes the said inner bead component and wherein a first bead component of each said coaxial pair has electric anisotropy resulting from triboelectric activity and electrophoretic activity in combination whereby an electric dipole results and the second bead component of each said coaxial bead pair has a magnetic anisotropy resulting from magnetic activity whereby a magnetic dipole results whereby electric signals supplied to the electrode means develop fields whereby the display bead components of each said coaxial bead pair tend to rotate to positions wherein the dipole moments tend to align with the said fields.

12. A method for the manufacture of the apparatus of claim 2 utilizing a frame having a thickness bounding an open central area between a first surface and a second surface and, a first set of six reference surfaces whereby kinematic positioning of a first subassembly relative to said frame is achievable when the first subassembly also comprises six reference surfaces and a second set of six reference surfaces whereby kinematic positioning of a second subassembly relative to said frame is achievable when the second subassembly also comprises six reference surfaces.

13. The method of claim 12 wherein said first subassembly comprises a first mold half and said second subassembly comprises a second mold half whereby when said first and second mold halves are kinematically positioned relative to the said frame a substrate is moldable having a first surface and a second surface wherein said surfaces are replicas of the of the mold half surfaces which face each other and wherein subsequently to the molding of said substrate said second mold half is replaceable with a first loom strung with a plurality of at least one string of said electronic circuit beads-on-a-fiber whereby said circuit beads comprise at least one column and one row and wherein said first loom includes six reference surfaces whereby kinematic positioning of said first loom relative to frame is achievable allowing mechanical connections bonding said fibers on said first loom to said molded substrate whereby a robust subassembly comprising said fibers and said substrate is achievable, allowing said first loom to be removed from said fibers and said frame and, wherein said first mold half is replaceable with a second loom strung with at least one string of display beads rotationally disposed as beads-on-a-fiber composed of at least one row and one column and wherein said second loom includes six reference surfaces whereby kinematic positioning of said second loom relative to said frame is achievable whereby mechanical connection is achievable by bonding the fiber upon which said beads are strung to said molded substrate and, wherein said beads remain rotationally disposed and allowing said second loom to be removed from said fibers and said frame and, wherein said method further comprises bonding a transmissive window to said fibers upon which said strings of display beads are strung whereby said manufactured apparatus comprises said substrate, said circuit beads, said display beads, and said transmissive window and wherein said circuit beads are bonded to said substrate second surface and said fibers upon which the display beads are strung are bonded to both said substrate first surface and said transmissive window and wherein said display beads are rotationally disposed.

* * * * *